(12) United States Patent
Brandt et al.

(10) Patent No.: US 11,096,446 B2
(45) Date of Patent: Aug. 24, 2021

(54) FLUID-FILLED STRUCTURE

(71) Applicant: NIKE, Inc., Beaverton, OR (US)

(72) Inventors: Christopher W. Brandt, Portland, OR (US); Jonathan A. Eckart, Tigard, OR (US); Danielle L. Taylor, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 399 days.

(21) Appl. No.: 15/936,008

(22) Filed: Mar. 26, 2018

(65) Prior Publication Data

US 2018/0213887 A1 Aug. 2, 2018

Related U.S. Application Data

(60) Continuation of application No. 14/812,396, filed on Jul. 29, 2015, now Pat. No. 9,936,766, which is a
(Continued)

(51) Int. Cl.
*A43B 13/20* (2006.01)
*B29C 65/00* (2006.01)
(Continued)

(52) U.S. Cl.
CPC ............ *A43B 13/20* (2013.01); *A43B 13/206* (2013.01); *B29C 51/105* (2013.01);
(Continued)

(58) Field of Classification Search
CPC ...... B29C 51/105; B29D 35/122; A43B 13/20
(Continued)

(56) References Cited

U.S. PATENT DOCUMENTS 2,090,881 A * 8/1937 Wilson ................ A43B 13/223
36/29
2,703,770 A 3/1955 Melzer
(Continued)

FOREIGN PATENT DOCUMENTS

CN 1285268 A 2/2001
CN 1291263 A 4/2001
(Continued)

OTHER PUBLICATIONS

European Patent Office, Communication pursuant to Article 94(3) EPC for Application No. 10798649.9, dated Feb. 12, 2015.
(Continued)

*Primary Examiner* — Timothy K Trieu
(74) *Attorney, Agent, or Firm* — Honigman LLP; Matthew H. Szalach; Jonathan O'Brien

(57) ABSTRACT

A fluid-filled chamber may include a pair of polymer layers that define a plurality of subchambers and a web area. The subchambers are protruding portions of the polymer layers that enclose a fluid, and the web area is portions of the polymer layers that are located between the subchambers and lay adjacent to each other. The subchambers may have greater thickness than the web area. A perimeter bond joining the polymer layers and extends around a periphery of the chamber. In addition, a plurality of interior bonds join the polymer layers and extend around the subchambers, which may seal the fluid within the subchambers.

20 Claims, 28 Drawing Sheets

Related U.S. Application Data division of application No. 12/630,695, filed on Dec. 3, 2009, now Pat. No. 9,119,439.

(51) Int. Cl.
*B29C 51/26* (2006.01)
*B29C 51/10* (2006.01)
*B29D 35/12* (2010.01)

(52) U.S. Cl.
CPC .......... *B29C 51/267* (2013.01); *B29C 66/438* (2013.01); *B29D 35/122* (2013.01)

(58) Field of Classification Search
USPC .................................................. 36/29, 25 R
See application file for complete search history.

(56) References Cited

U.S. PATENT DOCUMENTS

| | | |
|---|---|---|
| 2,991,500 A | 7/1961 | Hagen |
| 3,030,640 A | 4/1962 | Gosman |
| 3,685,176 A | 8/1972 | Rudy |
| 3,758,964 A | 9/1973 | Nishimura |
| 4,183,156 A * | 1/1980 | Rudy .................... A43B 17/035 36/29 |
| 4,187,620 A | 2/1980 | Selner |
| 4,217,705 A | 8/1980 | Donzis |
| 4,219,945 A | 9/1980 | Rudy |
| 4,287,250 A * | 9/1981 | Rudy .................... A43B 13/20 428/166 |
| 4,340,626 A | 7/1982 | Rudy |
| 4,358,902 A | 11/1982 | Cole et al. |
| 4,506,460 A | 3/1985 | Rudy |
| 4,547,919 A | 10/1985 | Wang |
| 4,698,864 A | 10/1987 | Graebe |
| 4,722,131 A | 2/1988 | Huang |
| 4,782,602 A | 11/1988 | Lakic |
| 4,803,029 A | 2/1989 | Iversen et al. |
| 4,817,304 A | 4/1989 | Parker et al. |
| 4,823,482 A | 4/1989 | Lakic |
| 4,829,682 A | 5/1989 | Gasbarro |
| 4,845,861 A | 7/1989 | Moumdjian |
| 4,874,640 A | 10/1989 | Donzis |
| 4,891,855 A | 1/1990 | Cheng-Chung |
| 4,906,502 A | 3/1990 | Rudy |
| 4,912,861 A | 4/1990 | Huang |
| 4,936,029 A | 6/1990 | Rudy |
| 4,991,317 A | 2/1991 | Lakic |
| 4,999,931 A | 3/1991 | Vermeulen |
| 5,022,109 A | 6/1991 | Pekar |
| 5,025,575 A | 6/1991 | Lakic |
| 5,042,176 A | 8/1991 | Rudy |
| 5,044,030 A | 9/1991 | Balaton |
| 5,158,767 A | 10/1992 | Cohen et al. |
| 5,179,792 A | 1/1993 | Brantingham |
| 5,193,246 A | 3/1993 | Huang |
| 5,199,191 A | 4/1993 | Moumdjian |
| 5,224,277 A | 7/1993 | Sang Do |
| 5,224,278 A | 7/1993 | Jeon |
| 5,228,156 A | 7/1993 | Wang |
| 5,235,715 A | 8/1993 | Donzis |
| 5,245,766 A | 9/1993 | Warren |
| 5,257,470 A | 11/1993 | Auger et al. |
| 5,335,382 A | 8/1994 | Huang |
| 5,337,492 A | 8/1994 | Anderie et al. |
| 5,353,459 A | 10/1994 | Potter et al. |
| 5,363,570 A | 11/1994 | Allen et al. |
| 5,367,791 A | 11/1994 | Gross et al. |
| 5,406,719 A | 4/1995 | Potter |
| 5,493,792 A | 2/1996 | Bates et al. |
| 5,572,804 A | 11/1996 | Skaja et al. |
| 5,592,706 A | 1/1997 | Pearce |
| 5,595,004 A | 1/1997 | Lyden et al. |
| 5,669,161 A | 9/1997 | Huang |
| 5,686,167 A | 11/1997 | Rudy |
| 5,704,137 A | 1/1998 | Dean et al. |
| 5,713,141 A | 2/1998 | Mitchell et al. |
| 5,741,568 A | 4/1998 | Rudy |
| 5,753,061 A | 5/1998 | Rudy |
| 5,771,606 A | 6/1998 | Litchfield et al. |
| 5,832,630 A | 11/1998 | Potter |
| 5,846,063 A | 12/1998 | Lakic |
| 5,907,911 A | 6/1999 | Huang |
| 5,916,664 A | 6/1999 | Rudy |
| 5,925,306 A | 7/1999 | Huang |
| 5,952,065 A | 9/1999 | Mitchell et al. |
| 5,976,451 A | 11/1999 | Skaja et al. |
| 5,979,078 A | 11/1999 | McLaughlin |
| 5,993,585 A | 11/1999 | Goodwin et al. |
| 6,009,637 A | 1/2000 | Pavone |
| 6,013,340 A | 1/2000 | Bonk et al. |
| 6,027,683 A | 2/2000 | Huang |
| 6,029,962 A | 2/2000 | Shorten et al. |
| 6,065,150 A | 5/2000 | Huang |
| 6,082,025 A | 7/2000 | Bonk et al. |
| 6,098,313 A | 8/2000 | Skaja |
| 6,127,010 A | 10/2000 | Rudy |
| 6,127,026 A | 10/2000 | Bonk et al. |
| 6,128,837 A | 10/2000 | Huang |
| 6,192,606 B1 | 2/2001 | Pavone |
| 6,203,868 B1 | 3/2001 | Bonk et al. |
| 6,253,466 B1 | 7/2001 | Harmon-Weiss et al. |
| 6,258,421 B1 | 7/2001 | Potter |
| 6,321,465 B1 | 11/2001 | Bonk et al. |
| 6,374,514 B1 | 4/2002 | Swigart |
| 6,385,864 B1 | 5/2002 | Sell, Jr. et al. |
| 6,402,879 B1 | 6/2002 | Tawney et al. |
| 6,430,843 B1 | 8/2002 | Potter et al. |
| 6,457,262 B1 | 10/2002 | Swigart |
| 6,463,612 B1 | 10/2002 | Potter |
| 6,550,085 B2 | 4/2003 | Roux |
| 6,571,490 B2 | 6/2003 | Tawney et al. |
| 6,665,958 B2 | 12/2003 | Goodwin |
| 6,783,184 B2 | 8/2004 | DiBattista et al. |
| 6,796,056 B2 | 9/2004 | Swigart |
| 6,837,951 B2 | 1/2005 | Rapaport |
| 6,892,477 B2 | 5/2005 | Potter et al. |
| 6,918,198 B2 | 7/2005 | Chi |
| 6,931,764 B2 | 8/2005 | Swigart et al. |
| 6,971,193 B1 | 12/2005 | Potter et al. |
| 7,000,335 B2 | 2/2006 | Swigart et al. |
| 7,051,456 B2 | 5/2006 | Swigart et al. |
| 7,070,845 B2 | 7/2006 | Thomas et al. |
| 7,076,891 B2 | 7/2006 | Goodwin |
| 7,086,179 B2 | 8/2006 | Dojan et al. |
| 7,128,796 B2 | 10/2006 | Hensley et al. |
| 7,131,218 B2 | 11/2006 | Schindler |
| 7,141,131 B2 | 11/2006 | Foxen et al. |
| 7,200,957 B2 | 4/2007 | Hubbard et al. |
| 7,244,483 B2 | 7/2007 | Tawney et al. |
| 2005/0132607 A1 | 6/2005 | Dojan et al. |
| 2009/0151195 A1* | 6/2009 | Forstrom ............. B29D 35/122 36/29 |

FOREIGN PATENT DOCUMENTS

| | | |
|---|---|---|
| FR | 1424147 A | 1/1966 |
| WO | WO-9922160 A1 | 5/1999 |
| WO | WO-2005046379 A1 | 5/2005 |

OTHER PUBLICATIONS

State Intellectual Property Office (P.R.C.), Notice of Allowance dated Jul. 31, 2014 for Chinese Patent Application No. 201080054023.0.
State Intellectual Property Office (P.R.C.), First Office Action dated Feb. 27, 2014 for Chinese Patent Application No. 201080054023.0.
International Search Report and Written Opinion dated May 25, 2011 in International Application No. PCT/US2010/055942.
USPTO, Non-Final Office Action for U.S. Appl. No. 14/812,396, dated May 23, 2016.
USPTO, Final Office Action for U.S. Appl. No. 14/812,396, dated Dec. 9, 2016.

(56) References Cited

OTHER PUBLICATIONS

USPTO, Non-Final Office Action for U.S. Appl. No. 14/812,396, dated May 4, 2017.
USPTO, Non-Final Office Action for U.S. Appl. No. 12/630,695, dated Oct. 25, 2012.
USPTO, Final Office Action for U.S. Appl. No. 12/630,695, dated Mar. 28, 2013.
USPTO, Non-Final Office Action for U.S. Appl. No. 12/630,695, dated Dec. 24, 2013.
USPTO, Final Office Action for U.S. Appl. No. 12/630,695, dated Jun. 23, 2014.
USPTO, Non-Final Office Action for U.S. Appl. No. 12/630,695, dated Dec. 4, 2014.

* cited by examiner

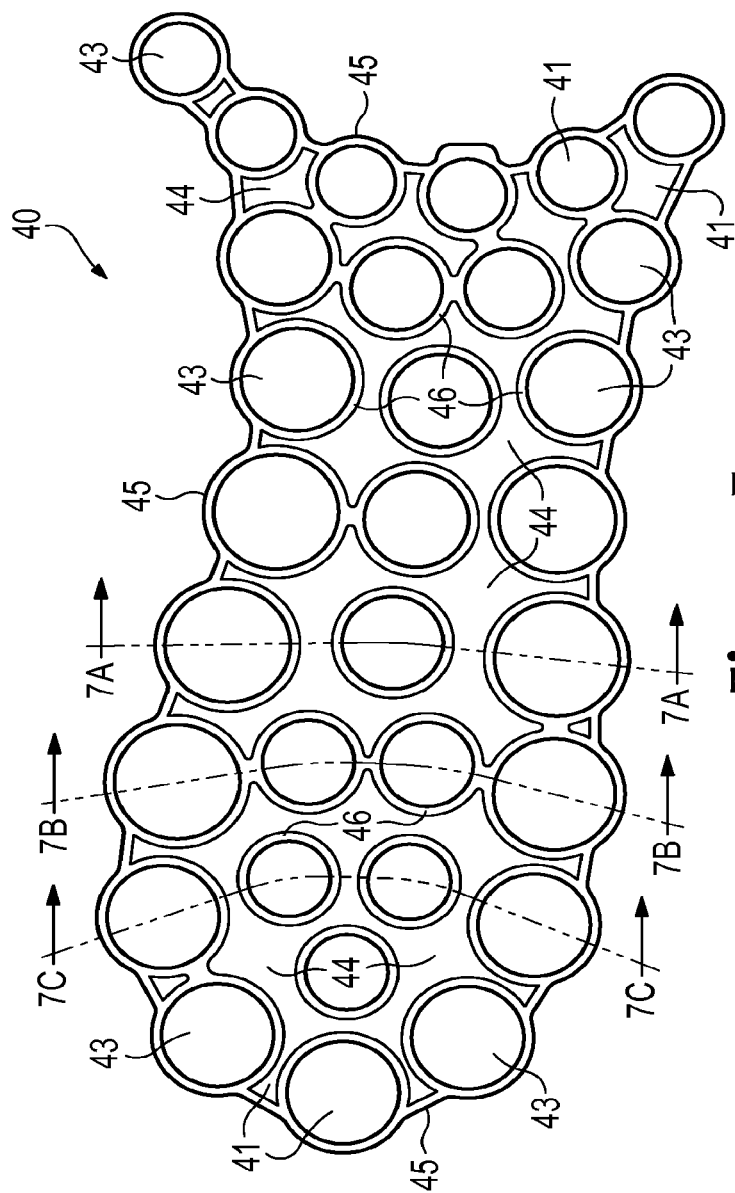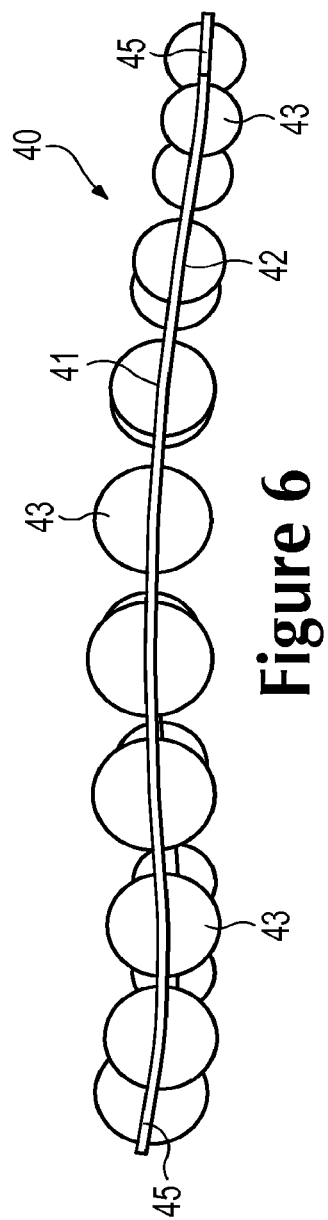
Figure 5
Figure 6

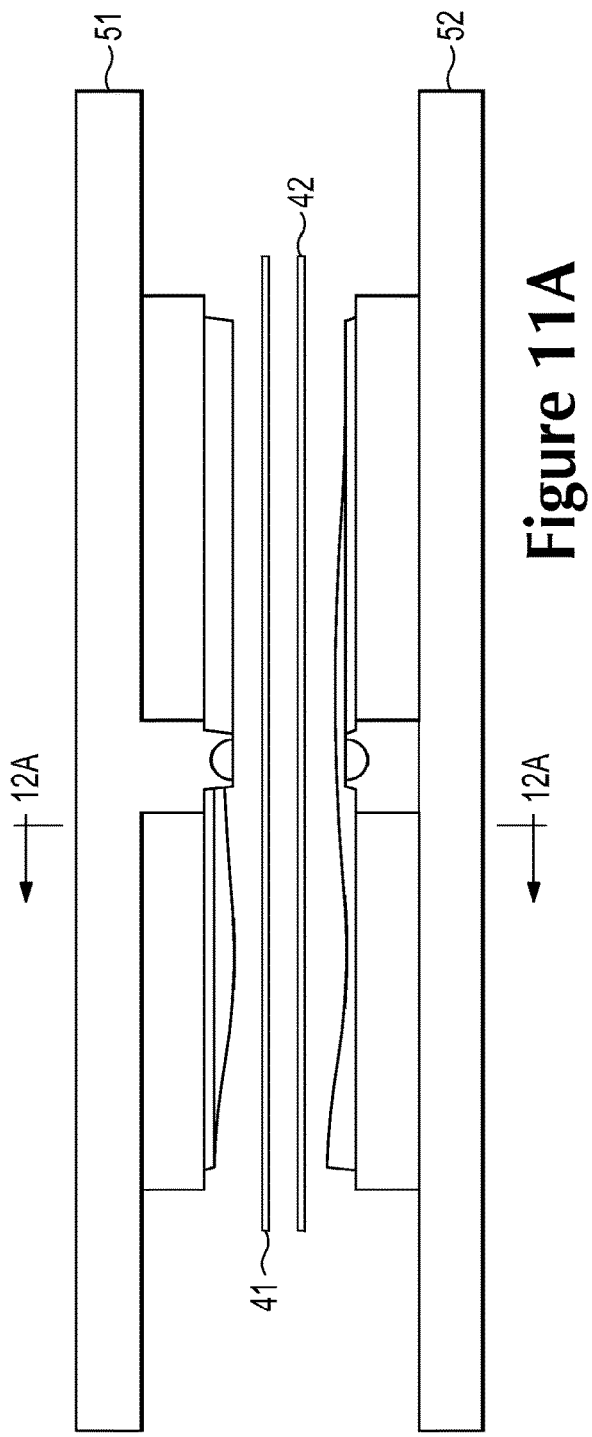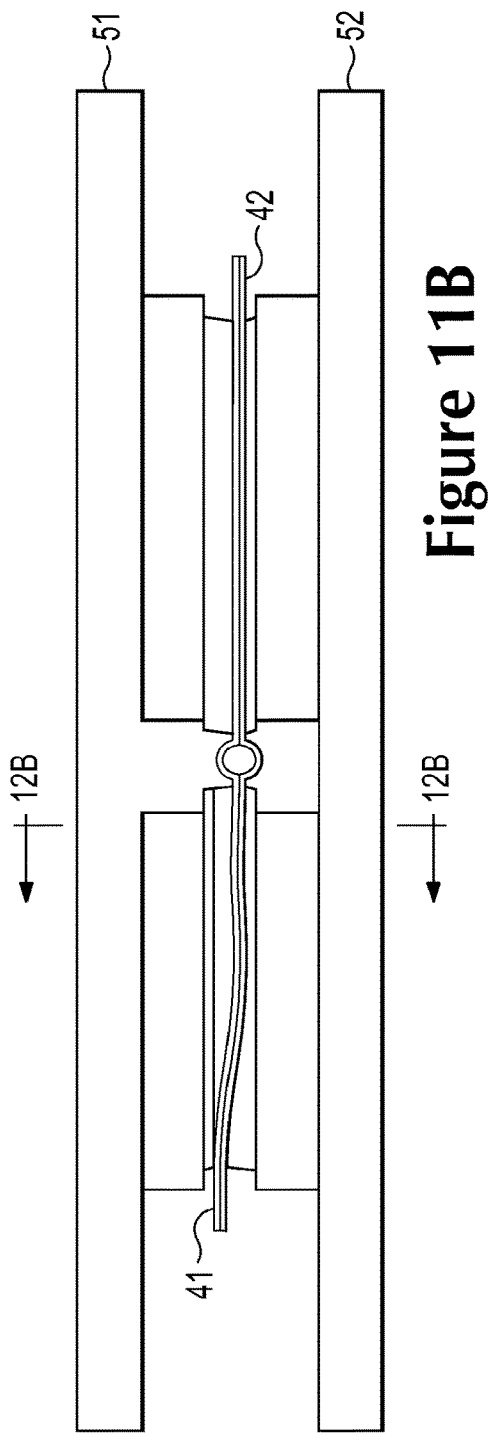

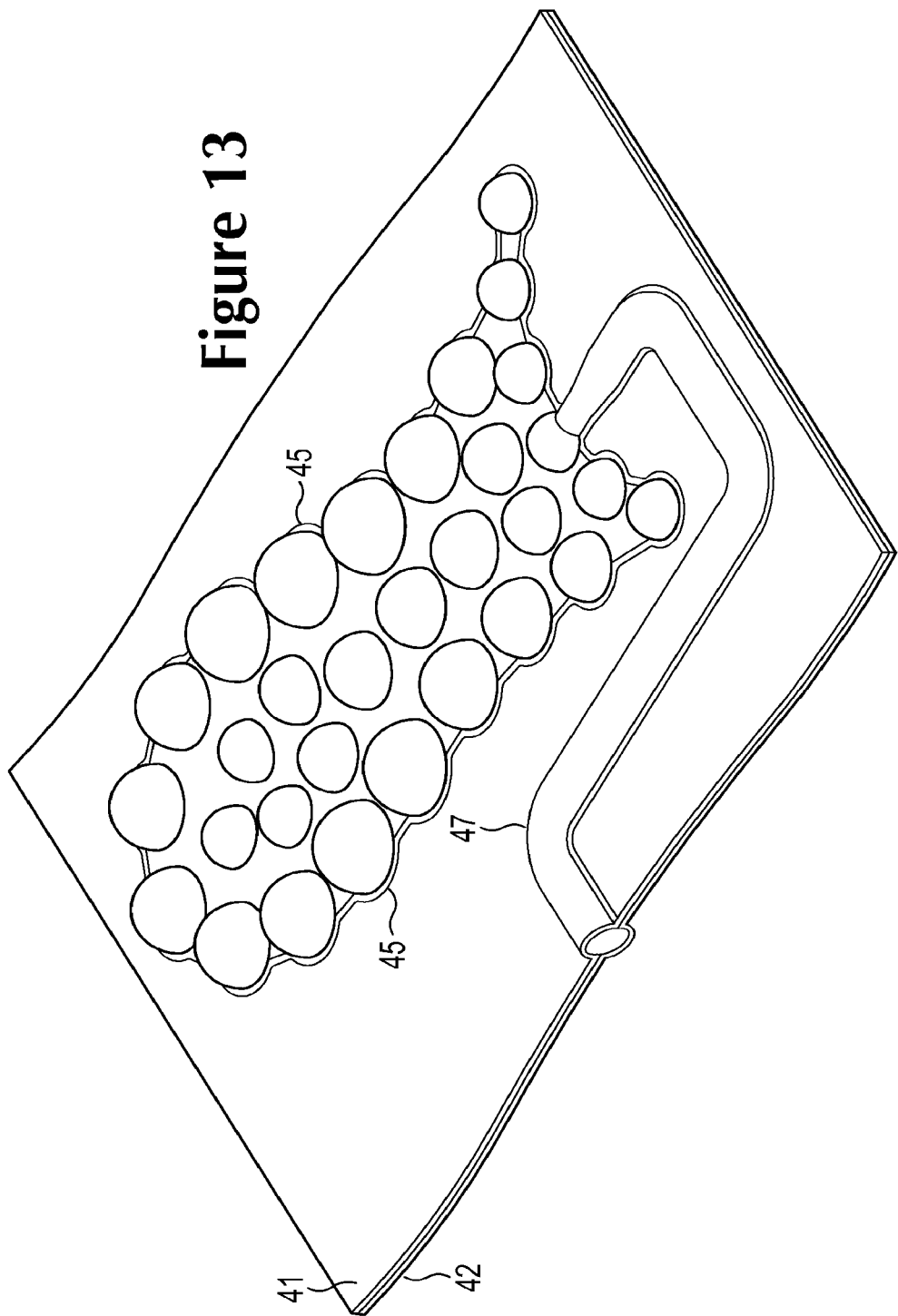

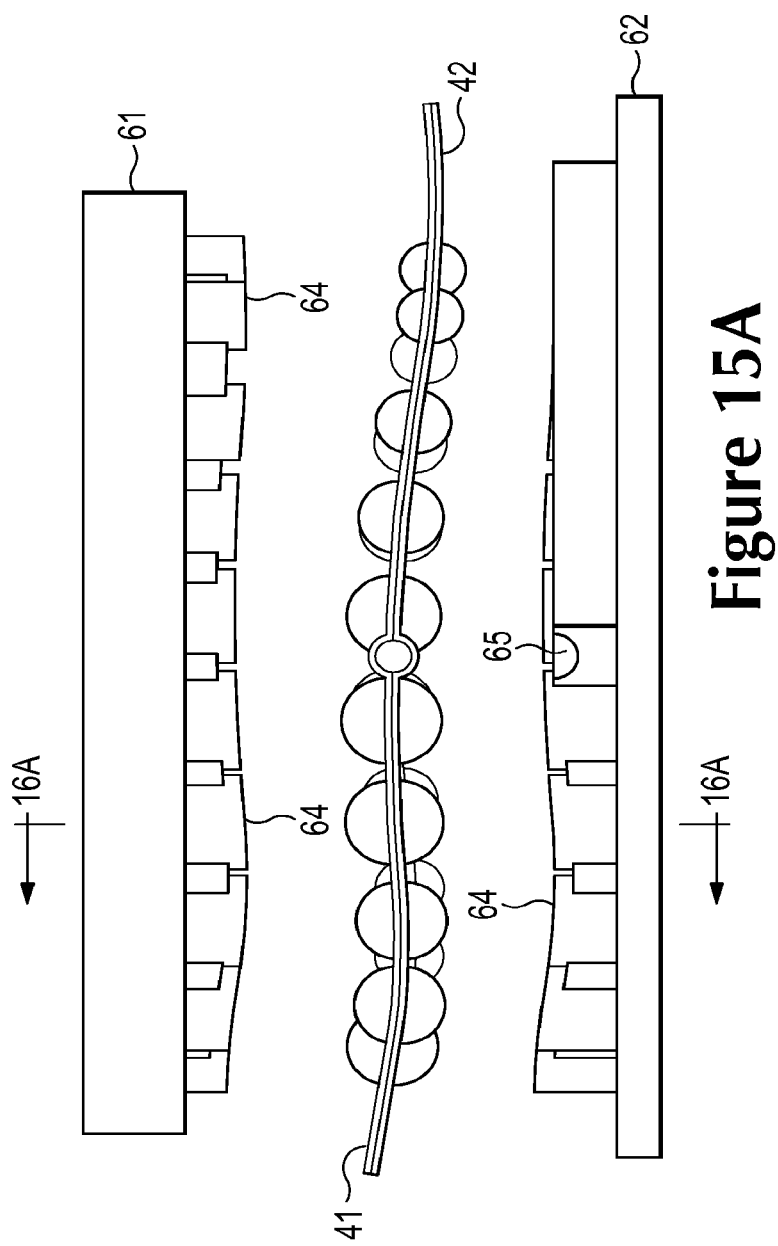

FLUID-FILLED STRUCTURE

CROSS REFERENCE TO RELATED APPLICATION

This application is a continuation of U.S. patent application Ser. No. 14/812,396, filed Jul. 29, 2015, which is a divisional of U.S. patent application Ser. No. 12/630,695, filed Dec. 3, 2009, the disclosures of which are incorporated herein by reference in their entirety.

FIELD

The present disclosure relates generally to a fluid-filled structure, and more particularly to a chamber having a plurality of fluid-filled subchambers.

BACKGROUND

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. More particularly, the upper generally extends over the instep and toe areas of the foot, along the medial and lateral sides of the foot, under the foot, and around the heel area of the foot. In some articles of footwear, such as basketball footwear and boots, the upper may extend upward and around the ankle to provide support or protection for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear.

The sole structure is located adjacent to a lower portion of the upper and is generally positioned between the foot and the ground. In many articles of footwear, including athletic footwear, the sole structure conventionally incorporates a sockliner, a midsole, and an outsole. The sockliner is a thin compressible member located within the void and adjacent to a lower surface of the void to enhance footwear comfort. The midsole, which is be secured to a lower area of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms the ground-contacting portion of the footwear and is usually fashioned from a durable and wear-resistant material that includes texturing to improve traction.

A variety of conventional midsoles incorporate a fluid-filled chamber that increases durability of the footwear and further enhances the attenuation of ground reaction forces in the sole structure. In some footwear configurations, the fluid-filled chamber may be at least partially encapsulated within a polymer foam material. In other footwear configurations, the fluid-filled chamber may substantially replace the polymer foam material. That is, substantially all of the midsole or a majority of the midsole may be formed from the fluid-filled chamber. In general, fluid-filled chambers are formed from a polymer material that is sealed and pressurized, but may also be substantially unpressurized or pressurized by an external source. In some configurations, textile or foam members may be located within the chamber, or reinforcing structures may be bonded to an exterior surface of the chamber to impart shape to or retain an intended shape of the chamber.

Fluid-filled chambers may be manufactured through various processes, including a two-film technique, thermoforming, and blowmolding. In the two-film technique, two planar sheets of polymer material are bonded together in various locations to form the chamber. In order to pressurize the chamber, a nozzle or needle connected to a fluid pressure source is inserted into a fill inlet formed in the chamber. Following pressurization, the fill inlet is sealed and the nozzle is removed. Thermoforming is similar to the two-film technique, but utilizes a heated mold that forms or otherwise shapes the sheets of polymer material during the manufacturing process. In blowmolding, a molten or otherwise softened elastomeric material in the shape of a tube (i.e., a parison) is placed in a mold having the desired overall shape and configuration of the chamber. The mold has an opening at one location through which pressurized air is provided. The pressurized air induces the liquefied elastomeric material to conform to the shape of the inner surfaces of the mold, thereby forming the chamber, which may then be pressurized.

Although fluid-filled chambers may be utilized in footwear, various configurations of the fluid-filled chambers may also be utilized in other products. For example, fluid-filled chambers may be incorporated into backpack straps, golf clubs, and cushions.

SUMMARY

Various fluid-filled chambers are discussed below. In one configuration, a chamber includes a pair of polymer layers that define a plurality of subchambers and a web area. The subchambers are protruding portions of the polymer layers that enclose a fluid, and the web area is portions of the polymer layers that are located between the subchambers and lay adjacent to each other. The subchambers may have greater thickness than the web area. A perimeter bond joining the polymer layers and extends around a periphery of the chamber. In addition, a plurality of interior bonds join the polymer layers and extending around the subchambers, which may seal the fluid within the subchambers.

Various methods for manufacturing chambers are discussed below. In one example, the method includes molding a first polymer layer and a second polymer layer to define a plurality of protrusions. A first bond is formed between the first polymer layer and the second polymer layer, and the first bond extends around a periphery of the chamber. A fluid is injected between the first polymer layer and the second polymer layer, and the fluid enters the protrusions. Additionally, a plurality of second bonds are formed between the first polymer layer and the second polymer layer, and the second bonds extend around each of the protrusions to seal the fluid within the protrusions.

The advantages and features of novelty characterizing aspects of the invention are pointed out with particularity in the appended claims. To gain an improved understanding of the advantages and features of novelty, however, reference may be made to the following descriptive matter and accom-

FIGURE DESCRIPTIONS

The foregoing Summary and the following Detailed Description will be better understood when read in conjunction with the accompanying figures.

FIG. 5 is a top plan view of the chamber.

FIG. 6 is a side elevational view of the chamber.

FIGS. 11A-11C are side elevational views of a molding process that utilizes the molding tool in the manufacture of the chamber.

FIG. 13 is a perspective view of material forming the chamber following the molding process.

FIGS. 15A-15C are side elevational views of a bonding and inflation process that utilizes the bond and inflate tool in the manufacture of the chamber.

DETAILED DESCRIPTION

The following discussion and accompanying figures disclose various configurations of fluid-filled chambers and methods for manufacturing the chambers. Although the chambers are disclosed with reference to footwear having a configuration that is suitable for running, concepts associated with the chambers may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chambers may also be utilized with footwear styles that are generally considered to be non-athletic, including dress shoes, loafers, and sandals. In addition to footwear, the chambers may be incorporated into other types of apparel and athletic equipment, including helmets, gloves, and protective padding for sports such as football and hockey. Similar chambers may also be incorporated into cushions, backpack straps, golf clubs, and other compressible structures utilized in household goods and industrial products. Accordingly, chambers incorporating the concepts disclosed herein may be utilized with a variety of products.

General Footwear Structure

Figure 1:
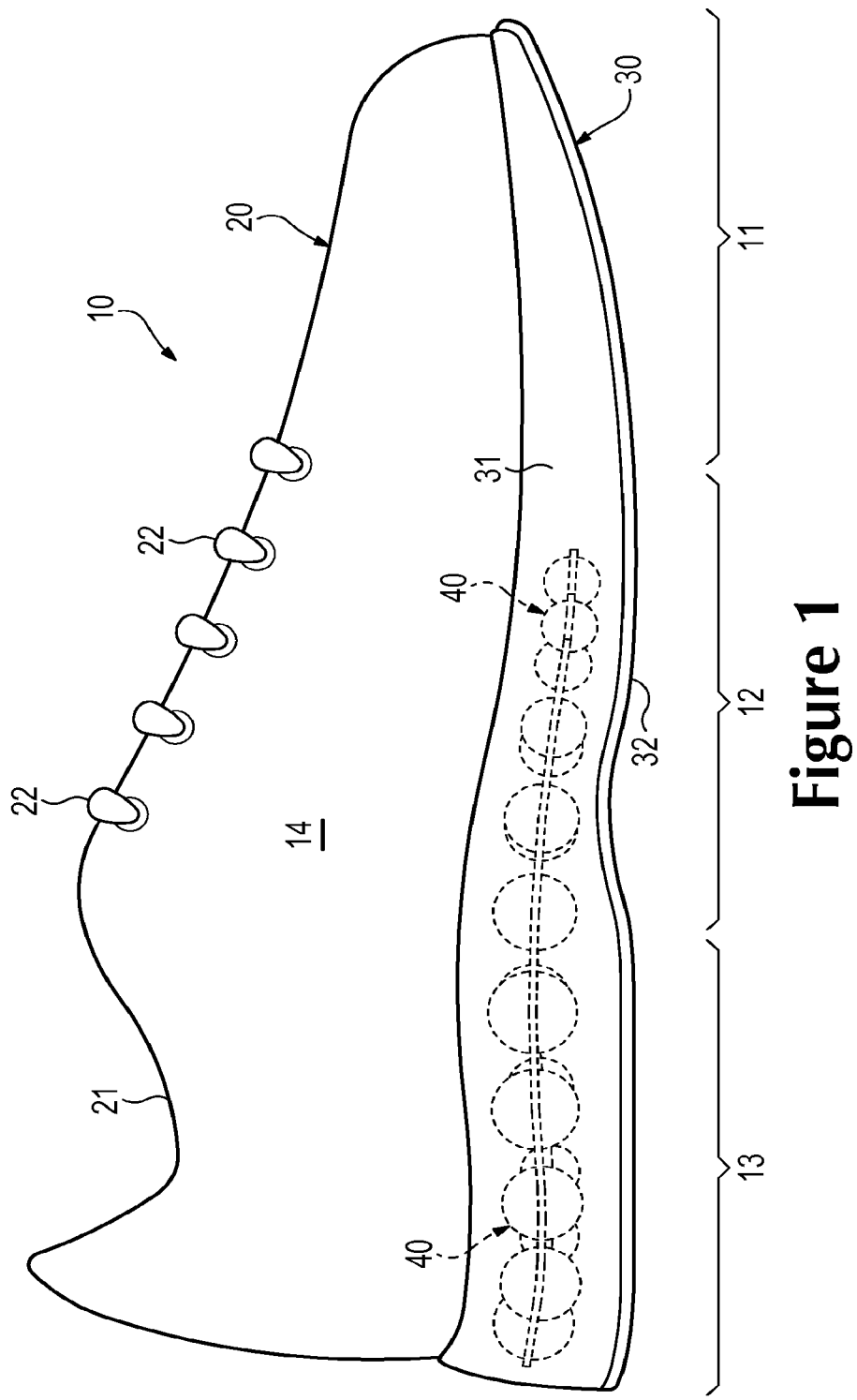
FIG. 1 is lateral side elevational view of an article of footwear.
Figure 2:
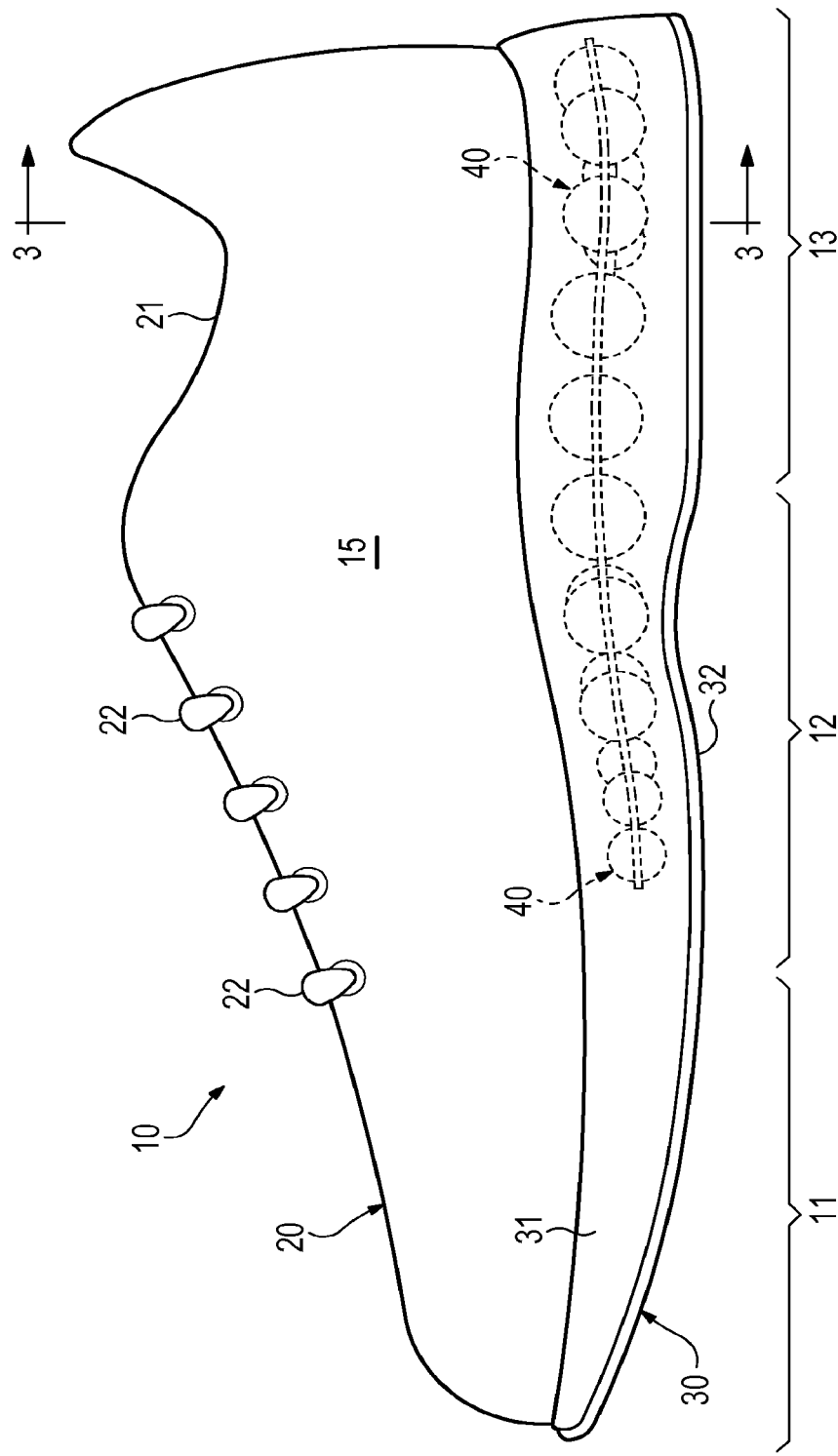
FIG. 2 is a medial side elevational view of the article of footwear.
Figure 3:
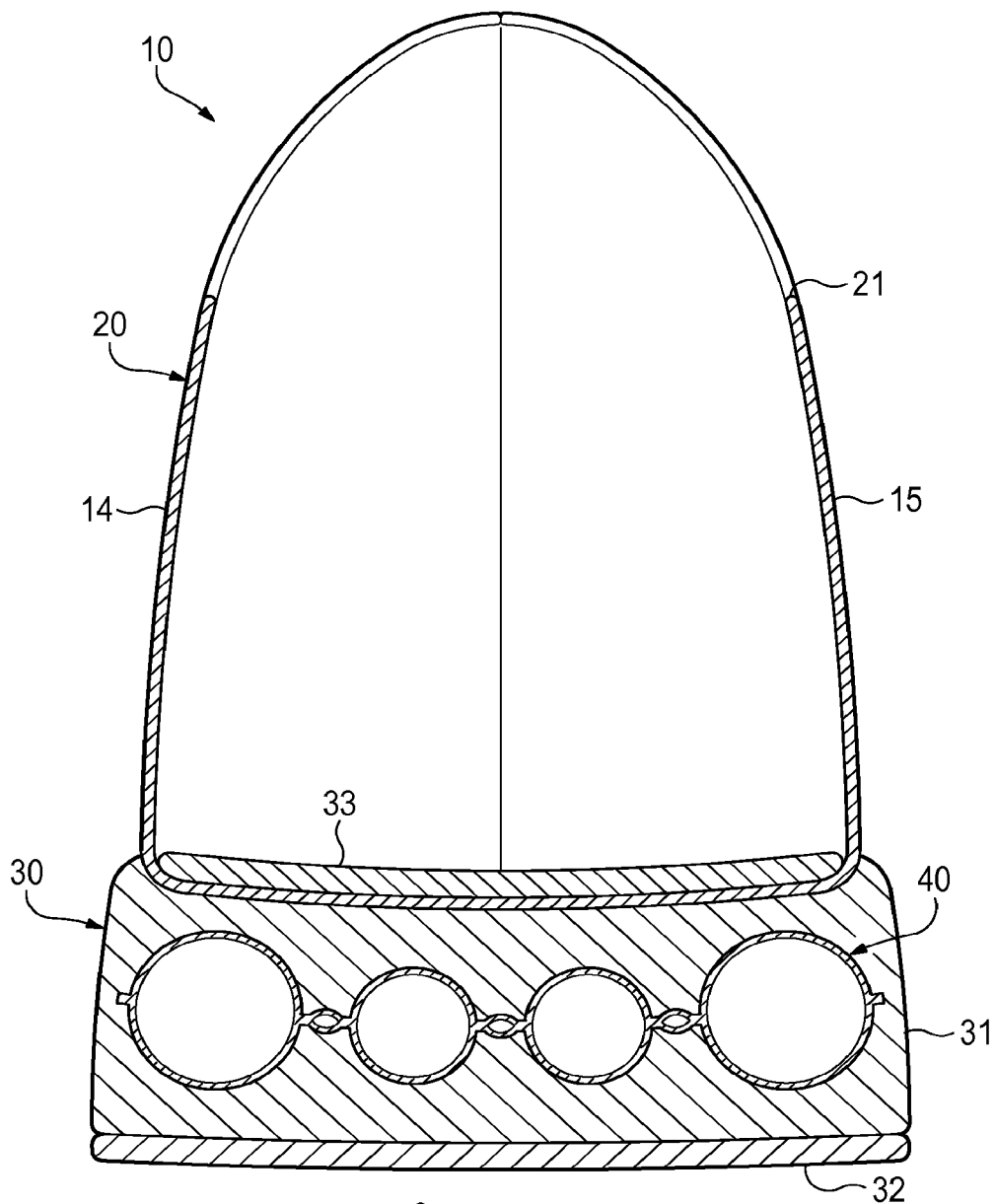
FIG. 3 is a cross-sectional view of the article of footwear, as defined by section line 3 in FIG. 2.
Figure 4:
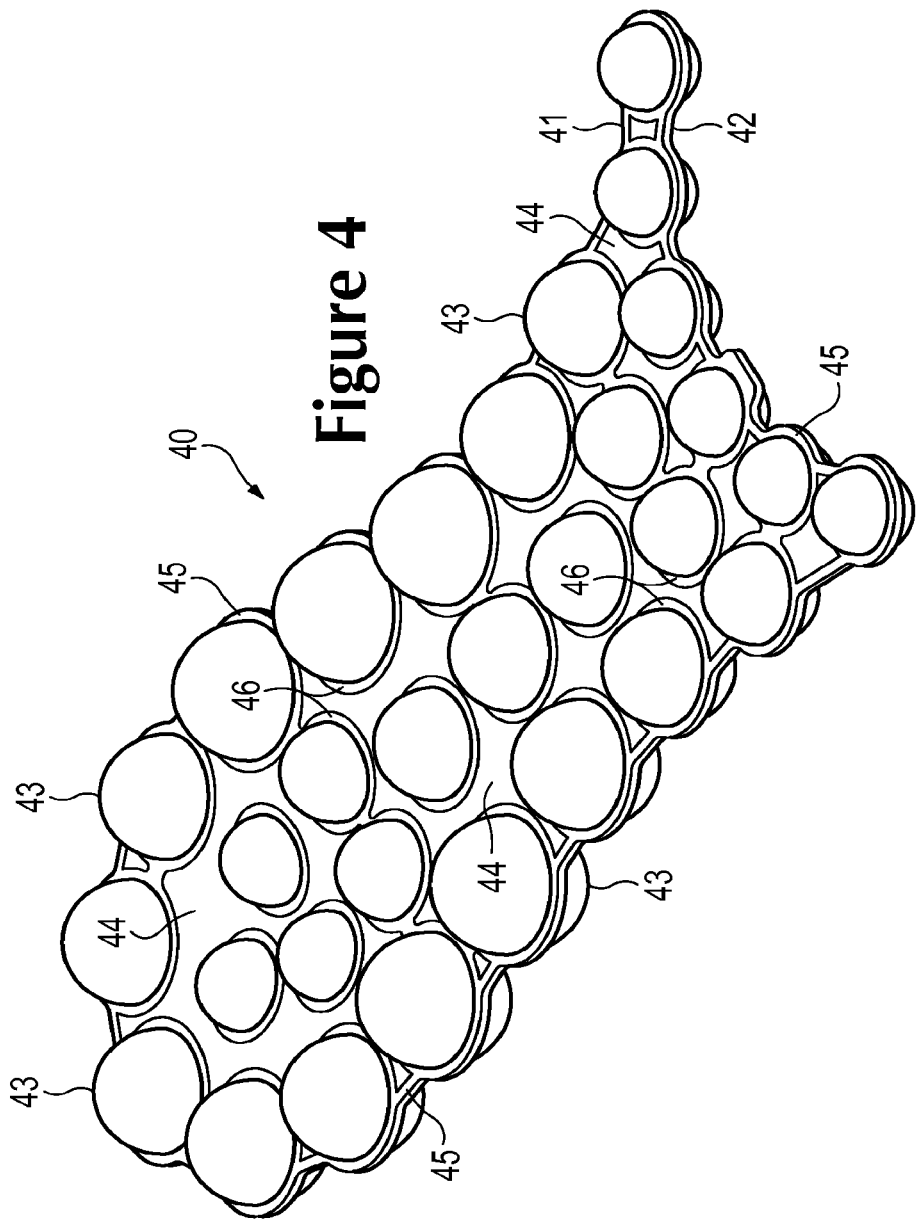
FIG. 4 is a perspective view of a chamber from the article of footwear.

An article of footwear 10 is depicted in FIGS. 1-3 as including an upper 20 and a sole structure 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration incorporating a plurality material elements (e.g., textiles, foam, leather, and synthetic leather) that are stitched or adhesively bonded together to form an interior void for securely and comfortably receiving a foot. The material elements may be selected and located with respect to upper 20 in order to selectively impart properties of durability, air-permeability, wear-resistance, flexibility, and comfort, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Given that various aspects of the present discussion primarily relate to sole structure 30, upper 20 may exhibit the general configuration discussed above or the general configuration of practically any other conventional or non-conventional upper. Accordingly, the overall structure of upper 20 may vary significantly.

Sole structure 30 is secured to upper 20 and has a configuration that extends between upper 20 and the ground. In addition to attenuating ground reaction forces (i.e., providing cushioning for the foot), sole structure 30 may provide traction, impart stability, and limit various foot motions, such as pronation. The primary elements of sole structure 30 are a midsole 31, an outsole 32, a sockliner 33, and a chamber 40. Midsole 31 is secured to a lower area of upper 20 and may be formed from various polymer foam materials (e.g., polyurethane or ethylvinylacetate foam) that extend through each of regions 11-13 and between sides 14 and 15. Additionally, midsole 31 at least partially envelops or receives chamber 40, which will be discussed in greater detail below. Outsole 32 is secured to a lower surface of midsole 31 and may be formed from a textured, durable, and wear-resistant material (e.g., rubber) that forms the ground-contacting portion of footwear 10. Sockliner 33, as depicted in FIG. 3, is located within a lower portion of the void in upper 20 and is positioned to contact a plantar (i.e., lower) surface of the foot to enhance the comfort of footwear 10. In addition to these elements, sole structure 30 may incorporate one or more support members, moderators, or reinforcing structures, for example, that further enhance the ground reaction force attenuation characteristics of sole structure 30 or the performance properties of footwear 10.

When incorporated into sole structure 30, chamber 40 has a shape that fits within a perimeter of midsole 31 and extends through heel region 13 and a portion of midfoot region 12, and also extends from lateral side 14 to medial side 15. Although chamber 40 is depicted as being entirely encapsulated within the polymer foam material of midsole 31, chamber 40 may be exposed on either of sides 14 and 15 in some configurations of footwear 10. When the foot is located within upper 20, chamber 40 extends under the foot in order to attenuate ground reaction forces that are generated when sole structure 30 is compressed between the foot and the ground during various ambulatory activities, such as running and walking. In some configurations, chamber 40 may protrude outward from midsole 31, may extend further into midfoot region 12, may extend forward to forefoot region 11, or may be solely located in forefoot region 11. In other configurations, chamber 40 may form a portion of an upper surface or a lower surface of midsole 31, chamber 40 may be positioned to form the ground-contacting portion of footwear 10, chamber 40 may form substantially all of midsole 31, or may be located within sockliner 33. Accordingly, the shape and dimensions of chamber 40, as well as the position of chamber 40 within footwear 10, may vary significantly.

Chamber Configuration

Chamber 40 is depicted individually in FIGS. 4-7B and is formed from a first layer 41 and a second layer 42. Each of layers 41 and 42 are molded or otherwise shaped to define various fluid-filled subchambers 43 that are separated and interconnected by a web area 44. Layers 41 and 42 are bonded or joined together in various locations to form (a) a peripheral bond 45 around a periphery of chamber 40 and (b) a plurality of interior bonds 46 around each of subchambers 43.

Layers 41 and 42 form opposite sides of chamber 40 and cooperatively define portions of subchambers 43 and web area 44. More particularly, opposite sides of each subchamber 43 are formed from layers 41 and 42, and opposite sides of web area 44 are also formed from layers 41 and 42. As oriented in the various figures, first layer 41 forms an upper portion of chamber 40, whereas second layer 42 forms a lower portion of chamber 40. In other configurations, this orientation may be reversed such that layers 41 and 42 respectively form the lower and upper portions of chamber 40. Although peripheral bond 45 is depicted as being centrally-located between upper and lower portions of chamber 40, peripheral bond may also be off-set from the center, which may enhance the aesthetics of chamber 40.

A wide range of polymer materials may be utilized for layers 41 and 42. In selecting a material for layers 41 and 42, the ability of the material to prevent the diffusion of the fluid contained by each of subchambers 43 may be considered, as well as the engineering properties of the material (e.g., tensile strength, stretch properties, fatigue characteristics, dynamic modulus, and loss tangent). When formed from a polymer material, layers 41 and 42 may have a thickness of approximately 1.0 millimeter, but the thickness may range from 0.25 to 4.0 millimeters or more, for example, depending upon the specific polymer material utilized. Examples of thermoplastic polymer materials that may be suitable for layers 41 and 42 include urethane, polyurethane, polyester, polyester polyurethane, and polyether polyurethane. Various thermoset polymer materials may also be utilized for layers 41 and 42. More specific examples of materials that may be utilized for layers 41 and 42 include the various materials disclosed in any of (a) U.S. Pat. Nos. 4,183,156, 4,219,945, 4,936,029, and 5,042,176 to Rudy; (b) U.S. Pat. Nos. 5,713,141 and 5,952,065 to Mitchell, et al.; and (c) U.S. Pat. Nos. 6,013,340, 6,082,025, 6,127,026, 6,203,868, and 6,321,465 to Bonk, et al.

Subchambers 43 exhibit a generally spherical shape and are distributed throughout chamber 40. As discussed above, layers 41 and 42 cooperatively define opposite sides or portions of subchambers 43. More particularly, each of layers 41 and 42 form various hemispherical areas (i.e., protrusions/indentations in layers 41 and 42) that cooperatively impart the spherical shapes to each of subchambers 43 when combined. Each of subchambers 43 have a generally hollow configuration that encloses a fluid (e.g., a gas, liquid, gel). Interior bonds 46 extend around subchambers 43 to prevent the fluid from escaping chamber 40 or passing between subchambers 43, thereby isolating subchambers 43 from fluid communication with each other. The fluid within subchambers 43 may be pressurized between zero and three-hundred-fifty kilopascals (i.e., approximately fifty-one pounds per square inch) or more. In addition to air and nitrogen, the fluid may include any of the gasses disclosed in U.S. Pat. No. 4,340,626 to Rudy.

Although subchambers 43 have similar shapes, the overall size or volume of subchambers 43 may vary significantly. For example, subchambers 43 located in heel region 13 exhibit a generally larger diameter, volume, or size than subchambers 43 located in midfoot region 12. Similarly, subchambers 43 located in a peripheral area of chamber 40 (i.e., adjacent to peripheral bond 45) exhibit a generally larger diameter, volume, or size than subchambers 43 located in a central area of chamber 40. This configuration places larger subchambers 43 under the heel of the foot and at the periphery of the foot.

Web area 44 extends between and generally interconnects the various subchambers 43. Whereas subchambers 43 protrude outward to form structures for receiving the fluid within chamber 40, web area 44 exhibits lesser thickness and forms portions of layers 41 and 42 that are adjacent to each other and may lay in contact with each other. Although some of subchambers 43 are immediately adjacent to other subchambers 43, a portion of web area 44 is generally located between adjacent subchambers 43, thereby extending between interior bonds 46 of the adjacent subchambers 43. Referring to the cross-sectional views of FIGS. 7A-7C, for example, the amount of web area 44 between adjacent subchambers 43 may vary considerably. In some areas of chamber 40, subchambers 43 exhibit a thickness or overall height that is ten times a thickness or height of web area 44. In general, however, the thickness of subchambers 43 ranges from three to greater than ten times the thickness of web area 44. In the areas between subchambers 43, web area 44 generally lays parallel to a plane of chamber 40 and does not include structural elements, such as fluid communication passages.

Figure 7A:
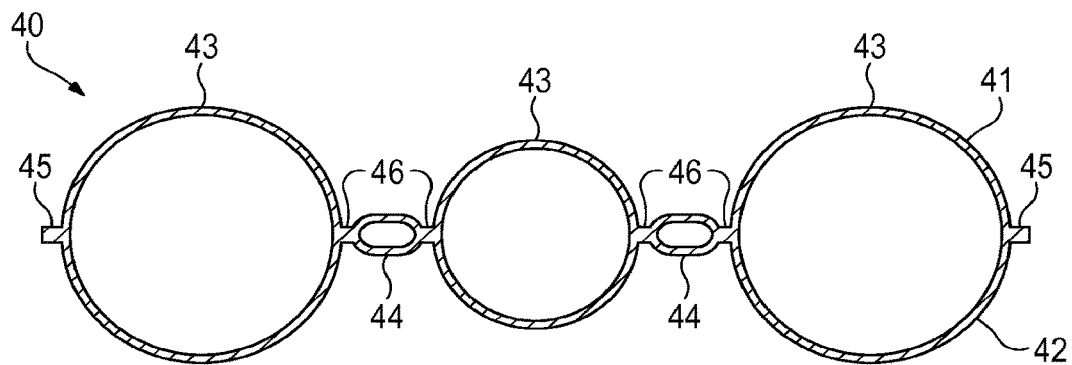
FIGS. 7A-7C are cross-sectional views of the chamber, as respectively defined by section lines 7A-7C in FIG. 5.
Figure 7B:
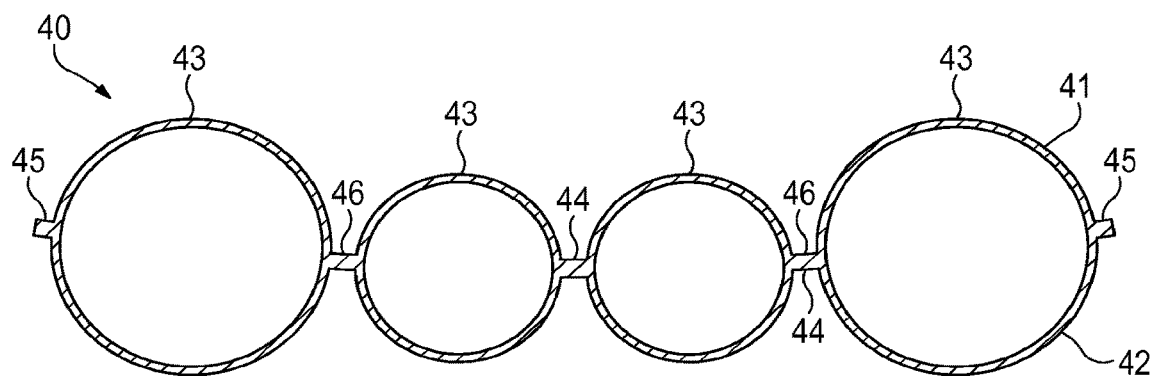
Figure 7C:
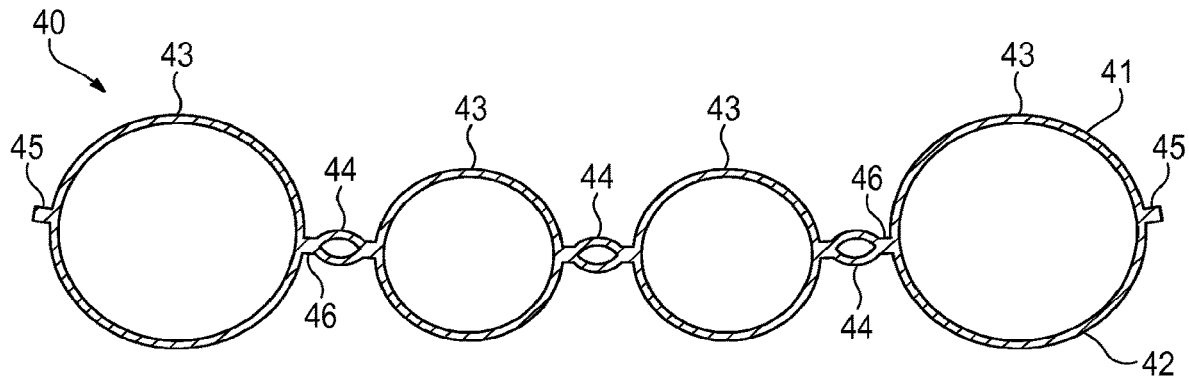

Peripheral bond 45 and interior bonds 46 form areas of chamber 40 where layers 41 and 42 are secured, bonded, or otherwise joined to each other. Peripheral bond 45 extends around the periphery of chamber 40, thereby joining layers 41 and 42 at the periphery. Similarly, interior bonds 46 extend around each of subchambers 43, thereby joining layers 41 and 42 at edges of each subchamber 43. Whereas peripheral bond 45 is primarily located at an edge of chamber 40, interior bonds 46 are primarily located at an interior of chamber 40. In areas where subchambers 43 are located at the periphery of chamber 40, however, interior bonds 46 coincide or otherwise overlap with peripheral bond 45. Although web area 44 may extend between adjacent interior bonds 46, as depicted in FIGS. 7A and 7C, two interior bonds 46 may effectively overlap between subchambers 43 that are immediately adjacent to each other, as depicted in FIG. 7B.

An advantage to chamber 40 relates to flexibility. More particularly, the configuration of web area 44 enhances the overall flexibility of chamber 40. In some fluid-filled structures, conduits or fluid communication passages extend between subchambers in order to transfer fluid to the subchambers during the manufacturing process. In chamber 40, however, conduits and fluid communication passages are absent between subchambers 43. That is, the manufacturing process for chamber 40, which is discussed in greater detail below, does not rely upon conduits to transfer fluid to the various subchambers. As a result, conduits and other molded structures are absent from web area 44, which increases the flexibility of web area 44, thereby increasing the overall flexibility of chamber 40.

Another advantage to chamber 40 relates to the configurability of the compressibility of each subchamber 43. In general, the compressibility of an individual subchamber 43 depends upon various factors, including (a) the thickness of layers 41 and 42 forming the subchamber 43, (b) the pressure of the fluid within the subchamber 43, and (c) the diameter or overall volume of the subchamber 43. By varying any of these factors, the compressibility of the individual subchamber 43 may be modified. More particularly, the compressibility may be increased by (a) decreasing the thickness of layers 41 and 42, (b) decreasing the pressure of the fluid, or (c) increasing the diameter or overall volume. Similarly, the compressibility may be decreased by (a) increasing the thickness of layers 41 and 42, (b) increasing the pressure of the fluid, or (c) decreasing the diameter or overall volume. By varying these factors throughout chamber 40, the compressibility of particular areas of chamber 40 may be configured for particular uses of chamber 40. As discussed in greater detail below, each of these factors may be modified during the manufacturing process of chamber 40.

Figure 8A:
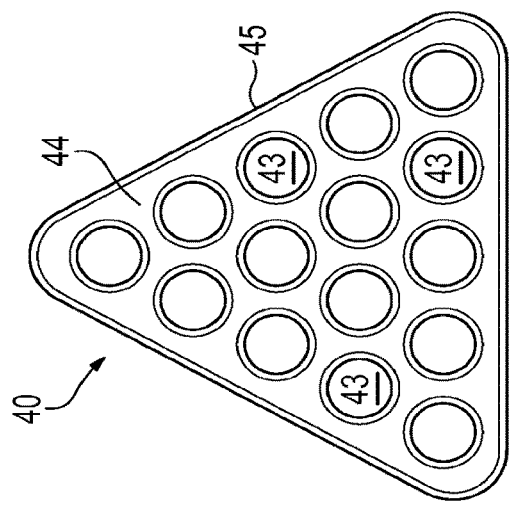
FIGS. 8A-8K are top plan views corresponding with FIG. 5 and depicting further configurations of the chamber.
Figure 8B:
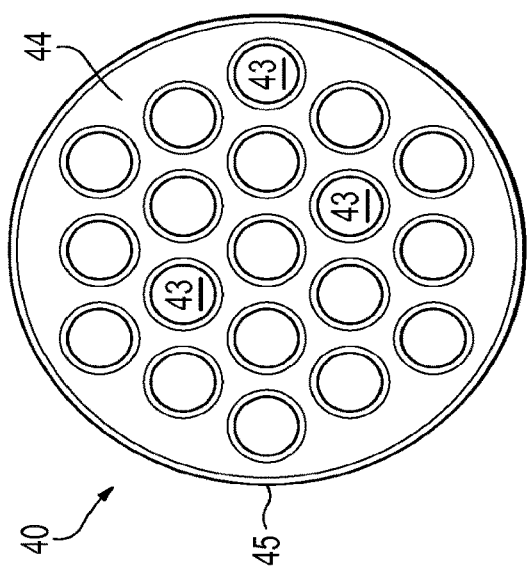
Figure 8C:
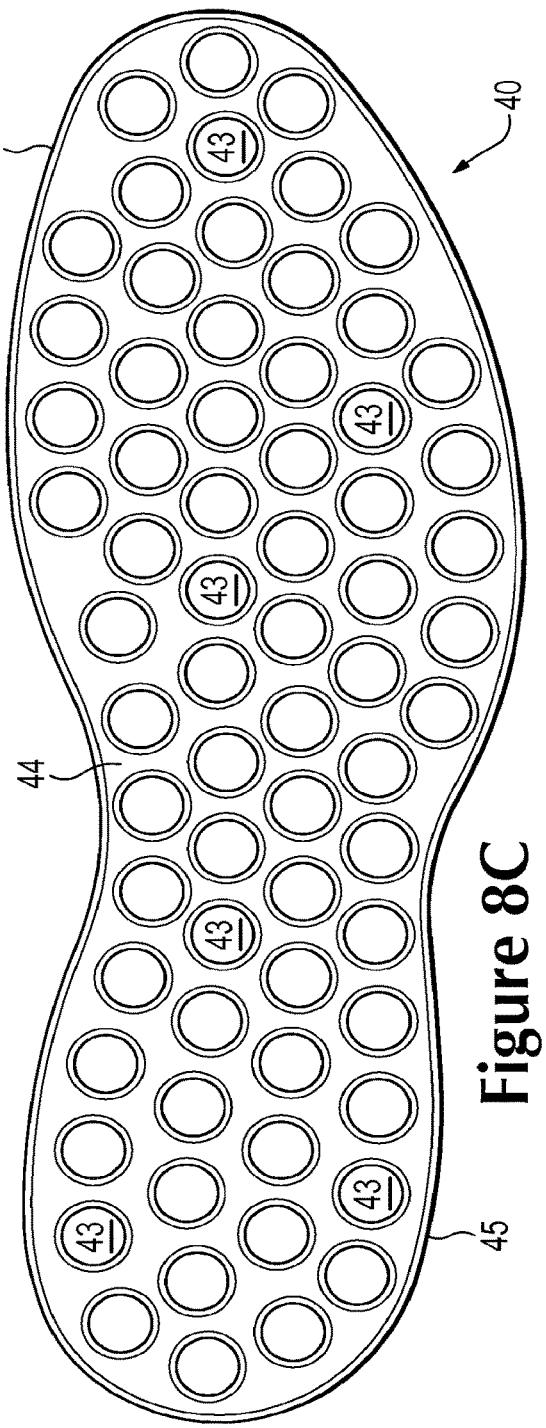
Figure 8D:
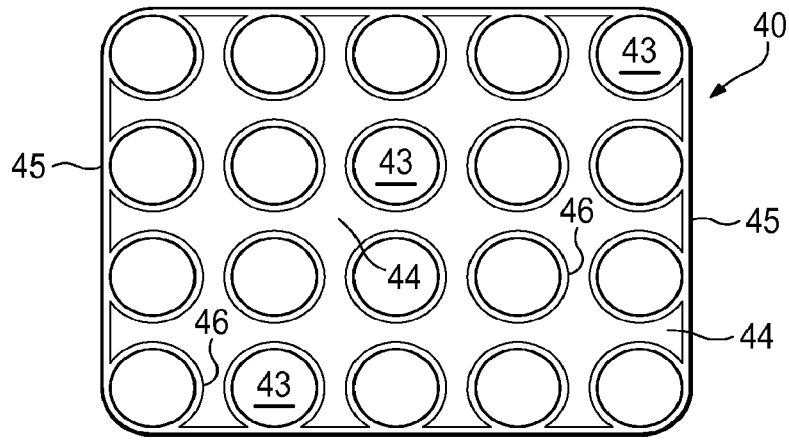
Figure 8E:
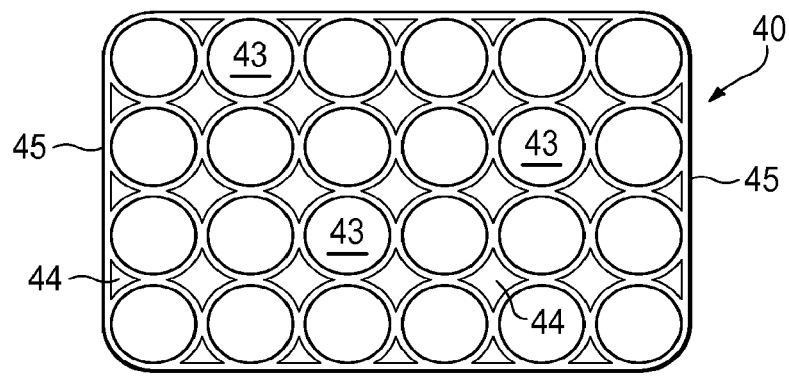
Figure 8F:
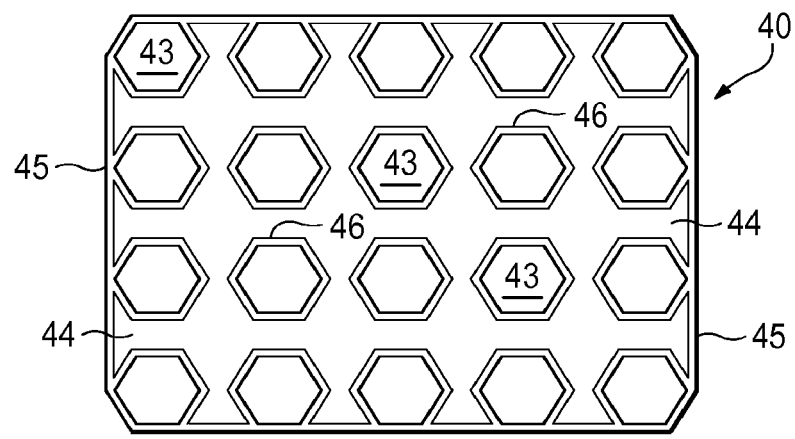
Figure 8G:
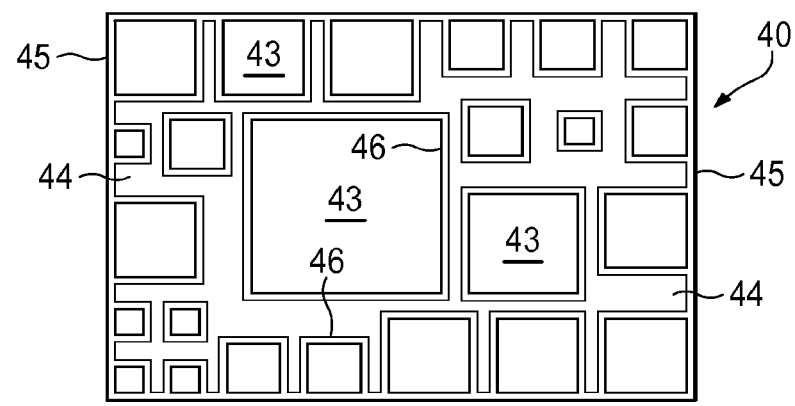
Figure 8H:
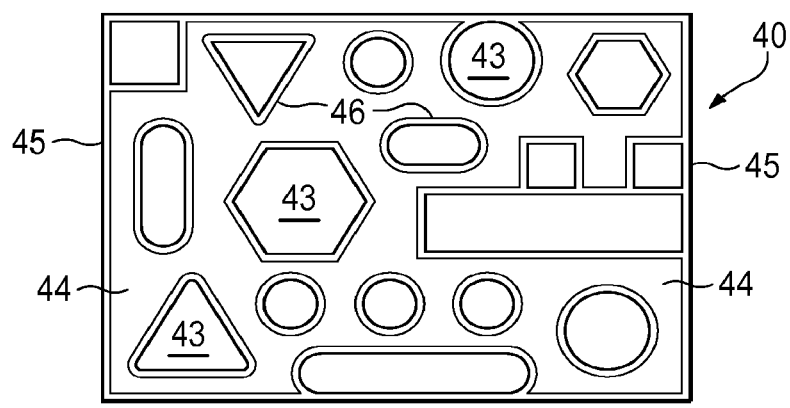
Figure 8I:
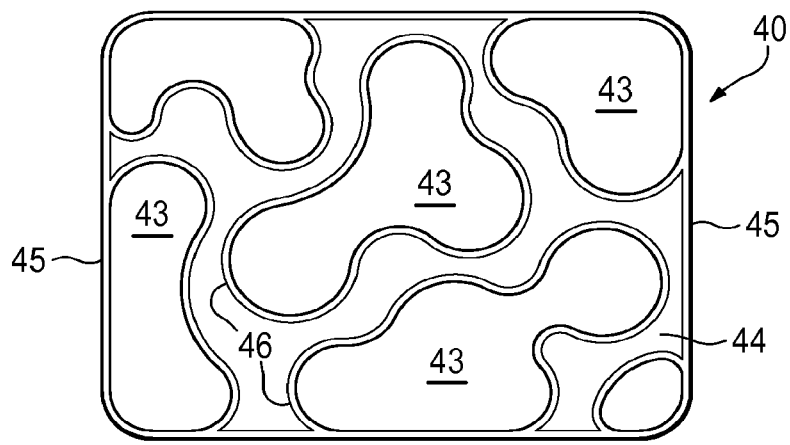
Figure 8J:
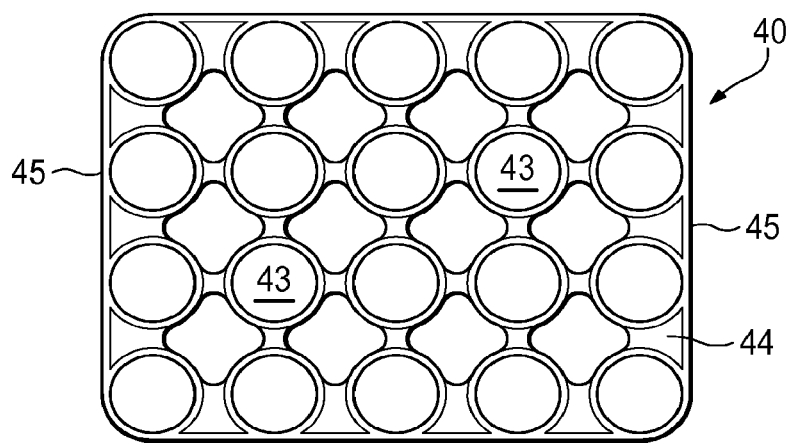
Figure 8K:
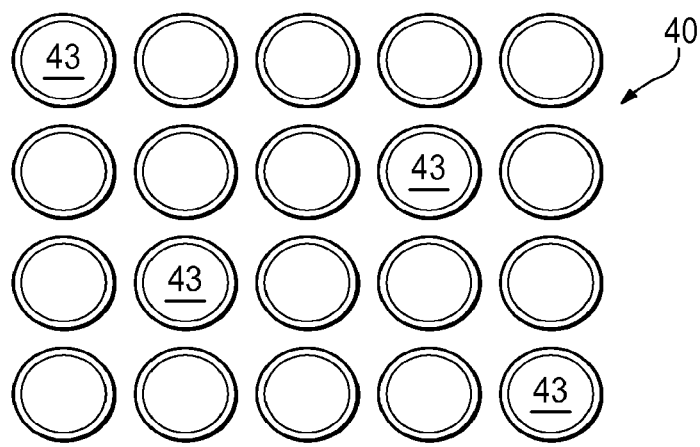

The configuration of chamber 40 discussed above provides one example of a suitable configuration for use in footwear 10 and other products. A variety of other configurations may also be utilized. For example, the overall shape of chamber 40 may vary to include a circular configuration, as depicted in FIG. 8A, or a triangular configuration, as depicted in FIG. 8B, each of which may be suitable for a variety of products. Other shapes specifically adapted for footwear, such as footwear 10, may also be used, as in the shoe outline shape depicted in FIG. 8C. Although subchambers 43 may be positioned as depicted in FIG. 5, a more regular spacing may also be utilized. Referring to FIG. 8D, subchambers 43 are positioned in rows and columns and spaced from each other. A similar configuration is depicted in FIG. 8E, wherein subchambers 43 contact or are placed in relative proximity to adjacent subchambers 43. FIGS. 8D and 8E also depict a configuration wherein the diameters or volumes of the various subchambers 43 are substantially identical. The shapes of subchambers 43 may also vary significantly to include hexagonal, square, varied, and irregular shapes, as depicted in FIGS. 8F-8I. In some configurations, web area 44 may be partially removed to form apertures extending through chamber 40, as depicted in FIG. 8J. Similarly, web area 44 may be entirely removed to form a plurality of discrete or separate structures formed from subchambers 43, as depicted in FIG. 8K. Accordingly, a variety of features relating to the shape of chamber 40, the positions, spacing, and shapes of subchambers 43, and the configuration of web area 44, for example, may be modified depending upon the intended use or purpose of chamber 40.

Figure 9A:
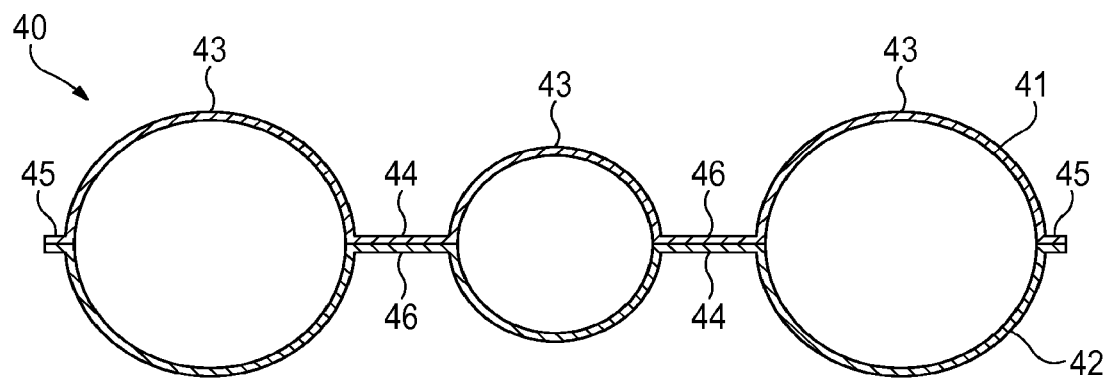
FIGS. 9A-9E are cross-sectional views corresponding with FIG. 7A and depicting further configurations of the chamber.
Figure 9B:
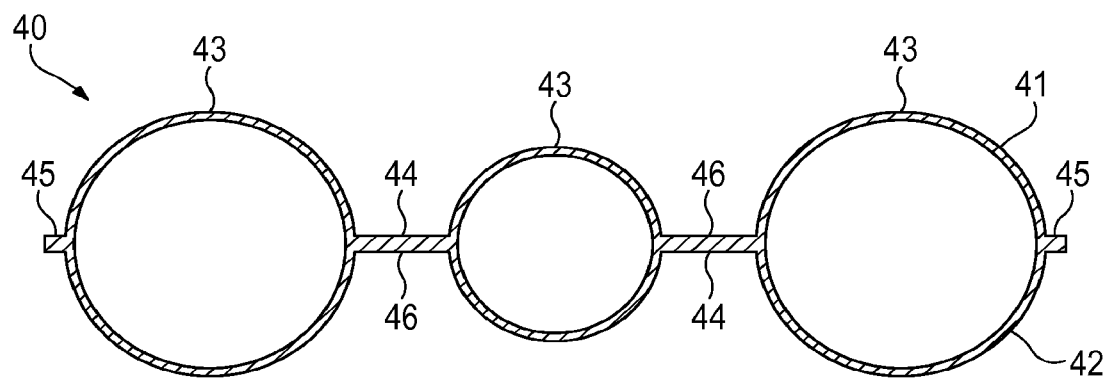
Figure 9C:
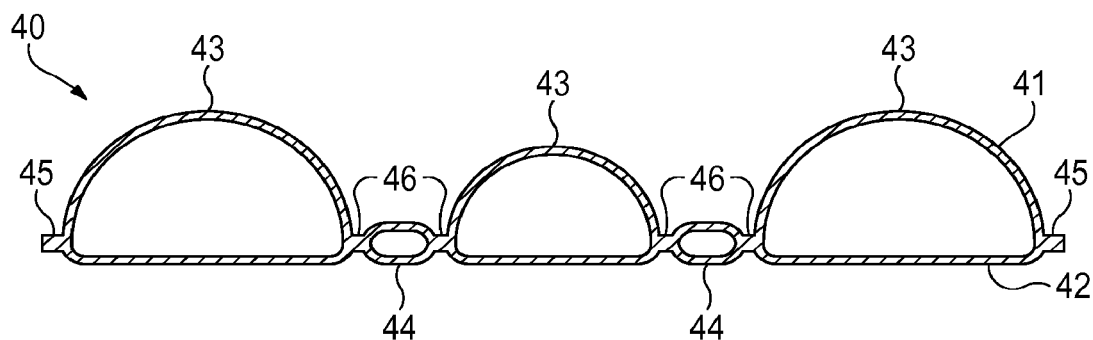
Figure 9D:
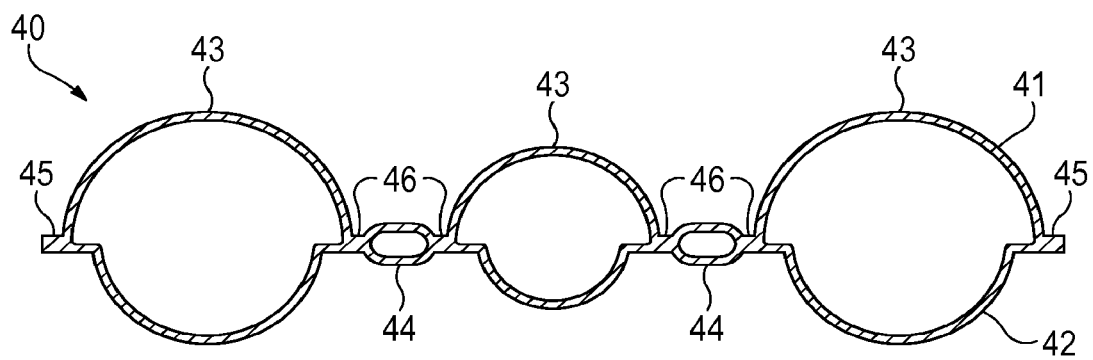
Figure 9E:
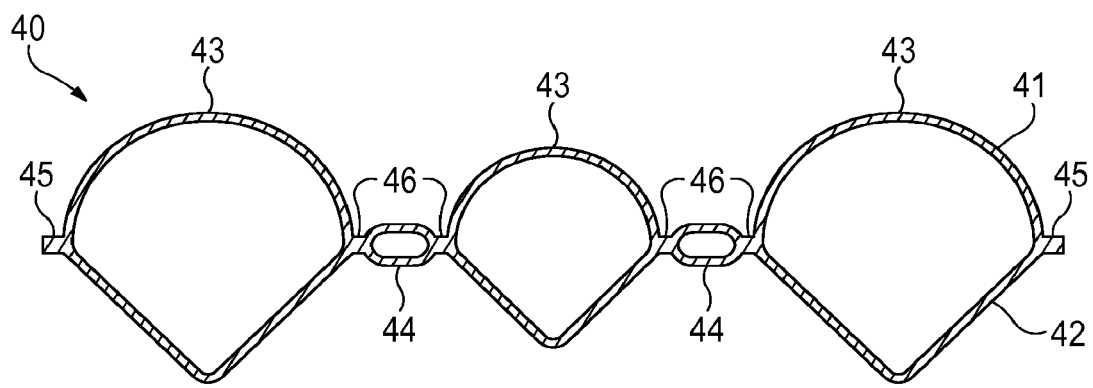

In addition to the variations discussed above with respect to FIGS. 8A-8K, further variations are depicted in FIGS. 9A-9E. Referring to the cross-sectional views of FIGS. 7A and 7C, layers 41 and 42 are spaced from each other in web area 44. If, for example, some of the fluid utilized to fill or pressurize subchambers 43 is present in web area 44, layers 41 and 42 may separate. In some configurations, however, layers 41 and 42 may contact each other in web area 44, as depicted in FIG. 9A. Similarly, layers 41 and 42 may be bonded to each other in web area 44, as depicted in FIG. 9B. Although the portions of subchambers 43 that are formed from layers 41 and 42 may be similarly-shaped, these portions may also have different configurations. Referring to FIG. 9C, for example, first layer 41 forms semicircular areas for chambers 43, wherein second layer 42 is planar. Layers 41 and 42 may also form structures of different size, as depicted in FIG. 9D, or with different shapes, as depicted in FIG. 9E. Accordingly, a variety of additional features relating to chamber 40 may be modified depending upon the intended use or purpose of chamber 40.

Chamber Manufacturing

In manufacturing chamber 40, two general processes are utilized: a molding process and an inflation and bonding process. In general, the molding process involves shaping of layers 41 and 42, and may also involve bonding layers 41 and 42 to form peripheral bond 45. The inflation and bonding process involves inflating or pressurizing subchambers 43 and bonding layers 41 and 42 to form interior bonds 46. Each of these processes will be discussed in greater detail below.

Figure 10:
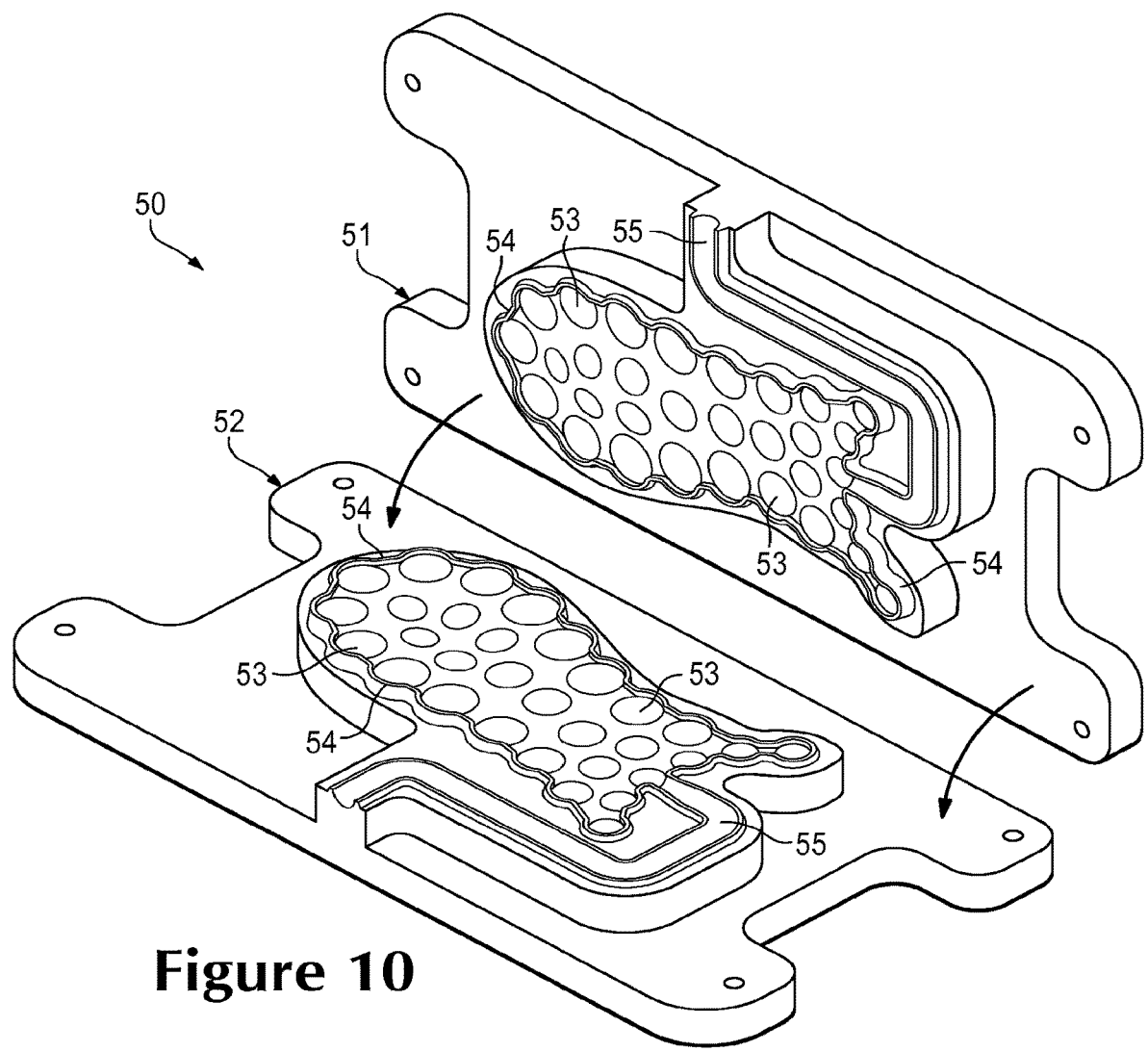
FIG. 10 is a perspective view of a molding tool.

A molding tool 50 is depicted in FIG. 10 as having a first mold portion 51 and a second mold portion 52. Mold portions 51 and 52 cooperatively define an internal cavity where layers 41 and 42 are molded to exhibit the general shape of chamber 40. More particularly, mold portions 51 and 52 each form various indentations 53 that correspond in location and size with subchambers 43, and mold portions 51 and 52 each define a peripheral ridge 54 that corresponds in location with peripheral bond 45. In other configurations, mold portions 51 and 52 may cooperatively define two internal cavities, one having the configuration of chamber 40, which is suitable for footwear 10 when configured for the right foot of the wearer, and the other having the configuration of a mirror image of chamber 40, which is suitable for footwear 10 when configured for the left foot of the wearer.

Figure 11C:
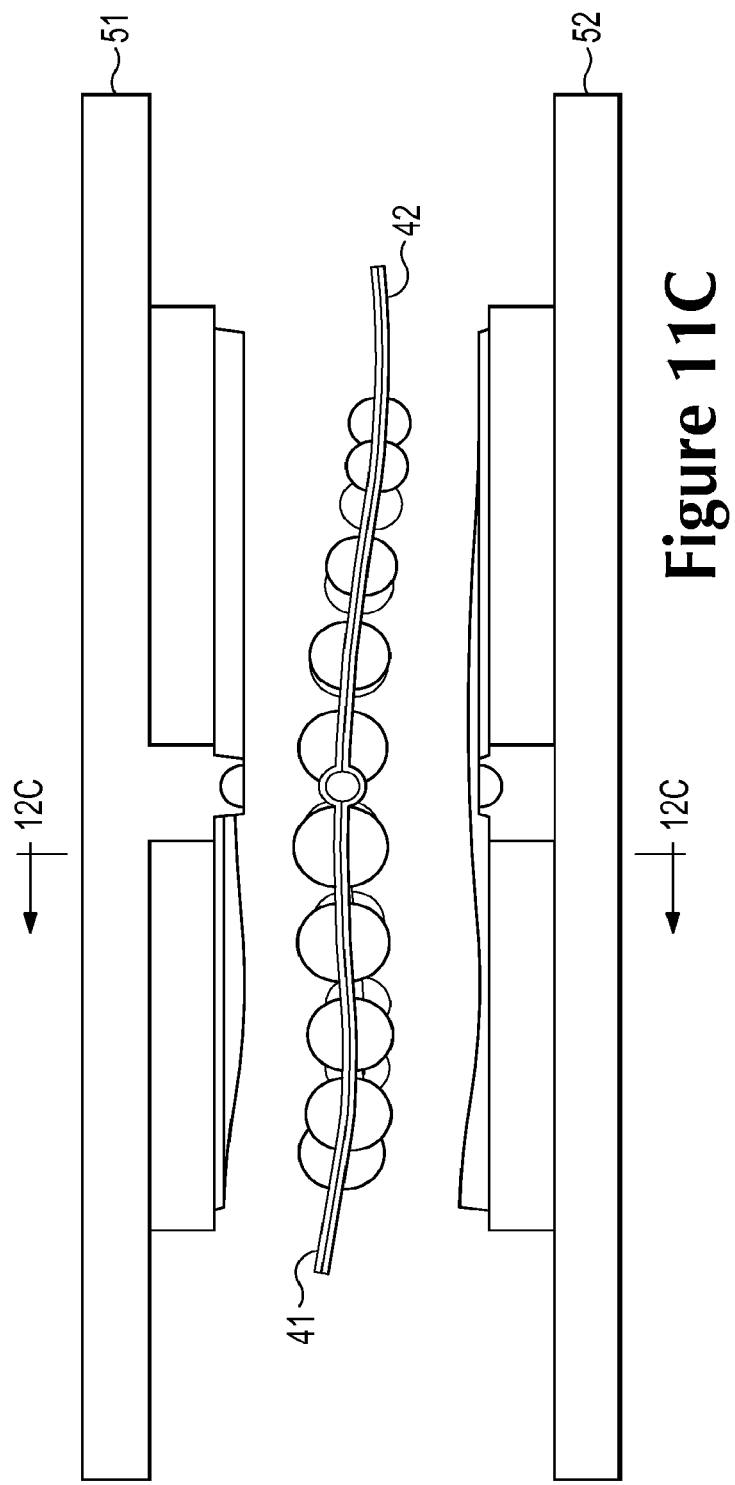
Figure 12A:
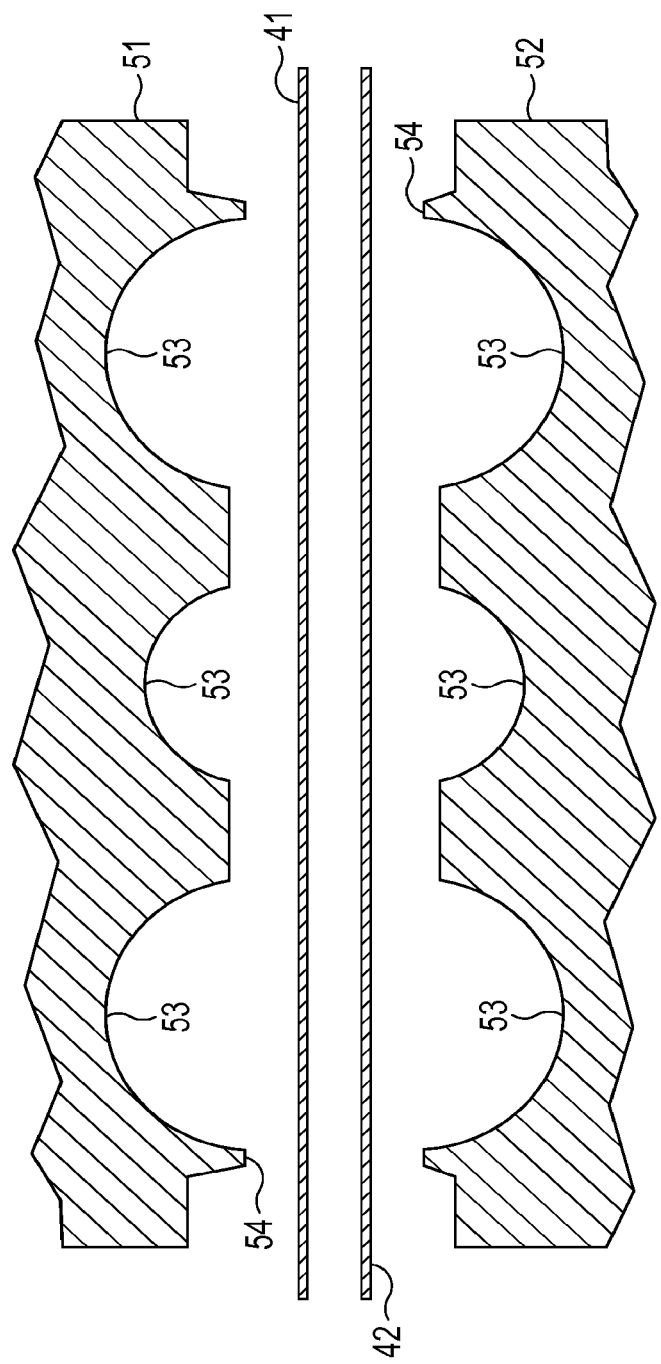
FIGS. 12A-12C are cross-sectional views of the molding process, as respectively defined by section lines 12A-12C in FIGS. 11A-11C.

The manner in which molding tool 50 is utilized to form chamber 40 from layers 41 and 42 will now be discussed in greater detail. Initially, layers 41 and 42 are positioned between mold portions 51 and 52, as depicted in FIGS. 11A and 12A. At this stage of the molding process, layers 41 and 42 are planar sheets of a polymer material that have not been molded or otherwise shaped. A plurality of conduits may extend through molding tool 50 in order to channel a heated liquid, such as water or oil, through molding tool 50, thereby raising the overall temperature of molding tool 50. When layers 41 and 42 are positioned within molding tool 50, heat may be transferred from molding tool 50 to layers 41 and 42 in order to raise the temperature of layers 41 and 42. At elevated temperatures that depend upon the specific polymer material utilized, layers 41 and 42 soften or become more deformable, which facilitates shaping and bonding. In some manufacturing processes, various conductive or radiative heaters may be utilized to heat layers 41 and 42 prior to placement within molding tool 50 in order to decrease manufacturing times.

Figure 12B:
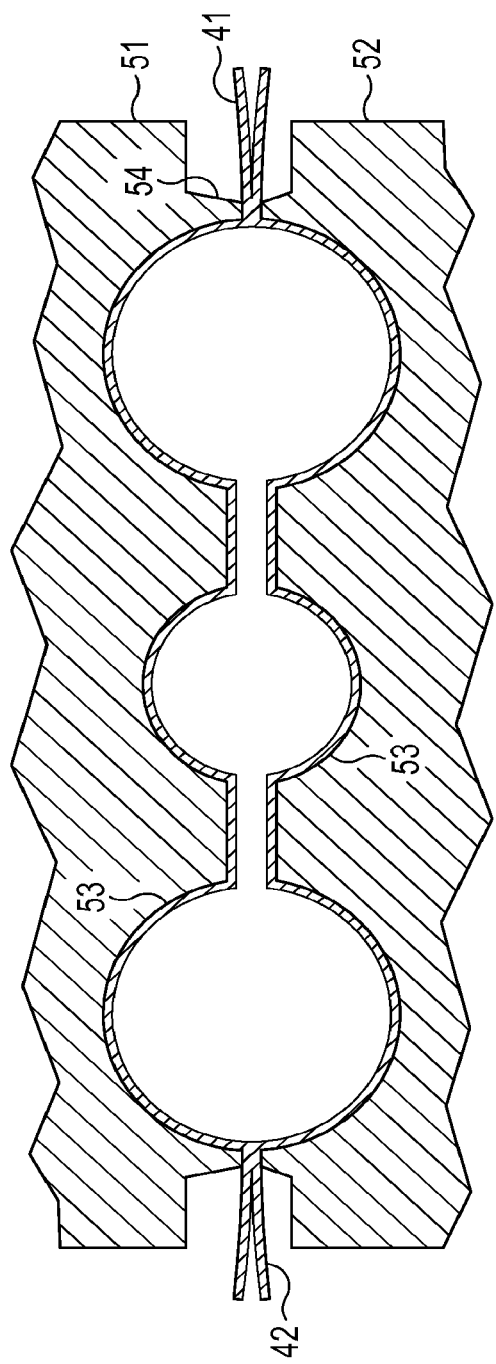
Figure 12C:
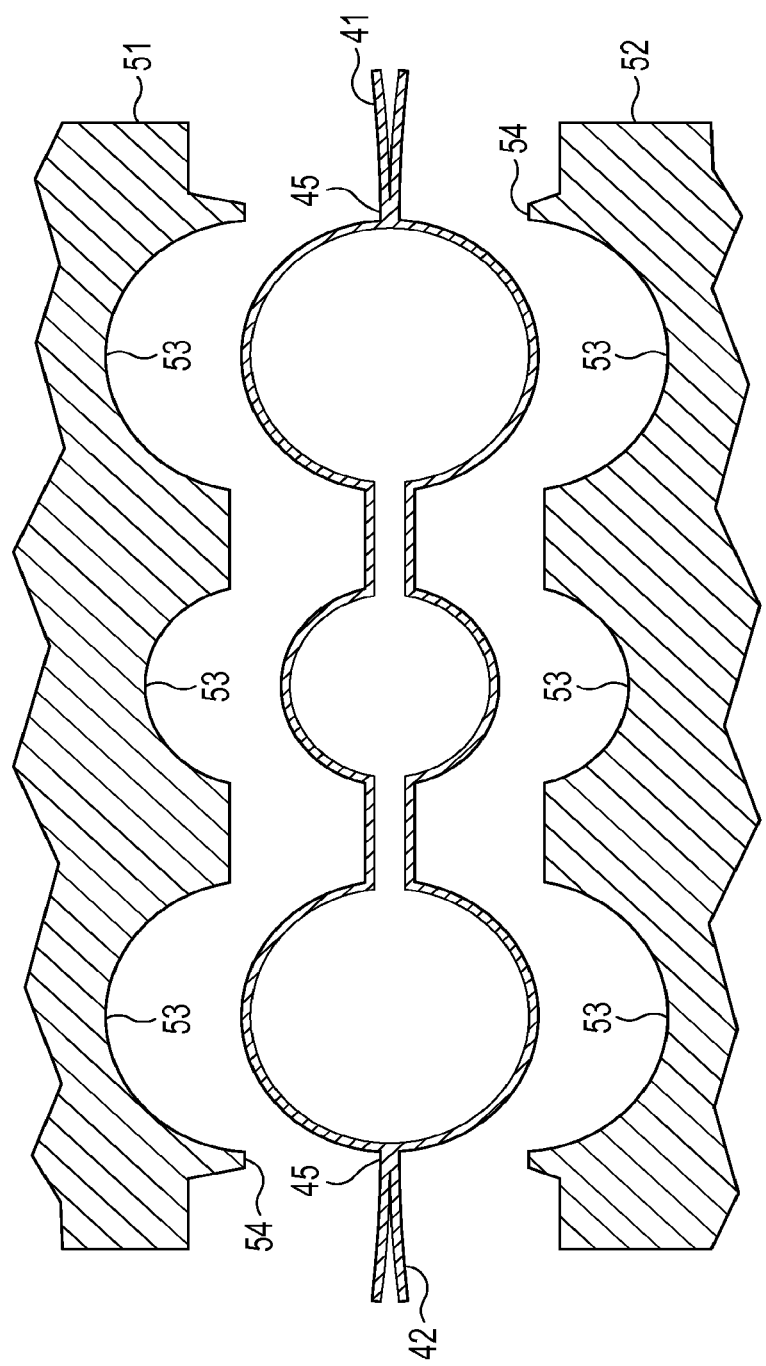

Once layers 41 and 42 are positioned between mold portions 51 and 52, mold portions 51 and 52 translate toward each other such that layers 41 and 42 enter the internal cavity within molding tool 50 and are shaped, as depicted in FIGS. 11B and 12B. As molding tool 50 contacts and envelops portions of layers 41 and 42, a fluid (e.g., air) having a positive pressure in comparison with ambient air may be injected between layers 41 and 42 to induce layers 41 and 42 to respectively contact and conform to the contours of mold portions 51 and 52 (i.e., enter indentations 53). Air may also be removed from the area between layers 41 and 42 and mold portions 51 and 52 through various vents, thereby drawing layers 41 and 42 onto the surfaces of mold portions 51 and 52. That is, at least a partial vacuum may be formed between layers 41 and 42 and the surfaces of mold portions 51 and 52. As the area between layers 41 and 42 is pressurized and air is removed from the area between molding tool 50 and layers 41 and 42, layers 41 and 42 conform to the shape of molding tool 50. More specifically, layers 41 and 42 stretch, bend, or otherwise conform to the portions of layers 41 and 42 forming subchambers 43 and web area 44, as depicted in FIG. 12C. That is, layers 41 and 42 may be spaced from each other in areas located inward from peripheral bond 45

Although the molding process discussed above is a suitable manner of shaping layers 41 and 41 during the manufacture of chamber 40, a blowmolding process may also be utilized. In general, a suitable blowmolding process involves positioning a parison between a pair of mold portions, such as mold portions 51 and 52. The parison is a generally hollow and tubular structure of molten polymer material. In forming the parison, the molten polymer material is extruded from a die. The wall thickness of the parison may be substantially constant, or may vary around the perimeter of the parison. Accordingly, a cross-sectional view of the parison may exhibit areas of differing wall thickness. Suitable materials for the parison include many of the materials discussed above with respect to layers 41 and 42. Following placement of the parison between the mold portions, the mold portions close upon the parison and pressurized air within the parison induces the liquefied elastomeric material to contact the surfaces of the mold. In addition, closing of the mold portions and the introduction of pressurized air induces the liquefied elastomeric material to contact the surfaces of the mold portions. Air may also be evacuated from the area between the parison and the mold portions to further facilitate molding and bonding. Accordingly, layers 41 and 42 may also be formed through a blowmolding process. As a further alternative, a conventional rotational molding process may be utilized to form layers 41 and 42.

Figure 14:
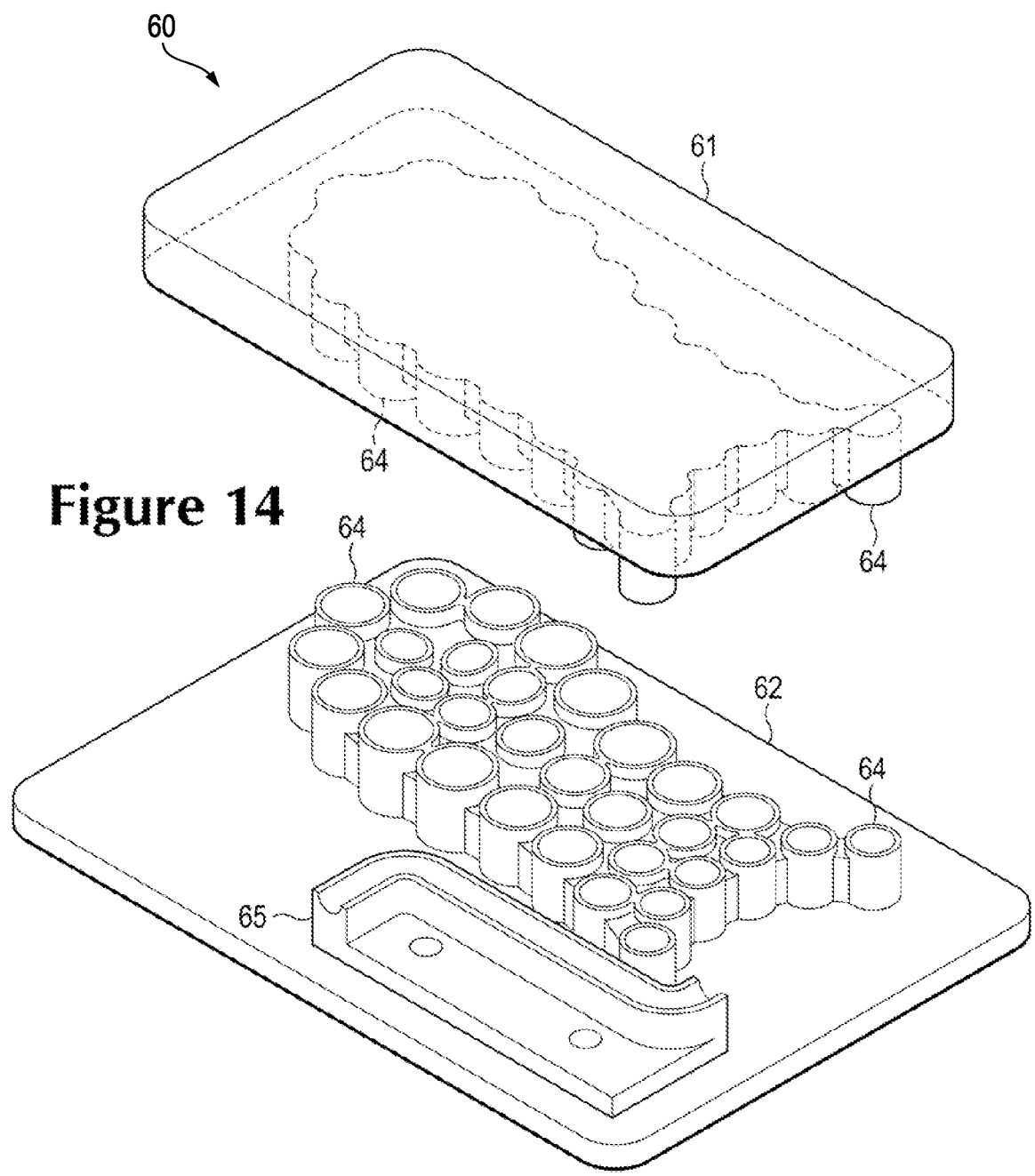
FIG. 14 is a perspective view of a inflate-bond tool.

Once the molding process is complete, the inflation and bonding process may be utilized to inflate subchambers 43 and form interior bonds 46. A inflate-bond tool 60 is depicted in FIG. 14 as having a first portion 61 and a second portion 62. Portions 61 and 62 cooperatively define an internal cavity having the general shape of chamber 40. More particularly, portions 61 and 62 each (a) form various indentations 63 that correspond in location and size with subchambers 43 and (b) define a interior ridges 64 that extend around indentations 63 and correspond in location with interior bonds 46. Additionally, at least portion 62 includes an inflation connector 65 that interfaces with channel 47. In other configurations, portions 61 and 62 may cooperatively define two internal cavities, one having the configuration of chamber 40, which is suitable for footwear 10 when configured for the right foot of the wearer, and the other having the configuration of a mirror image of chamber 40, which is suitable for footwear 10 when configured for the left foot of the wearer.

The manner in which inflate-bond tool 60 is utilized to continue forming chamber 40 will now be discussed in greater detail. Initially, the molded structure formed from layers 41 and 42 using molding tool 50 is positioned between portions 61 and 62, as depicted in FIGS. 15A and 16A. Additionally, an end of channel 47 is joined with inflation connector 65. At this stage of the process, layers 41 and 42 are generally molded to define semi-circular protrusions corresponding with subchambers 43. Layers 41 and 42 are also bonded together to form peripheral bond 45, and channel 47 provides a fluid inlet to the area between layers 41 and 42.

Figure 15B:
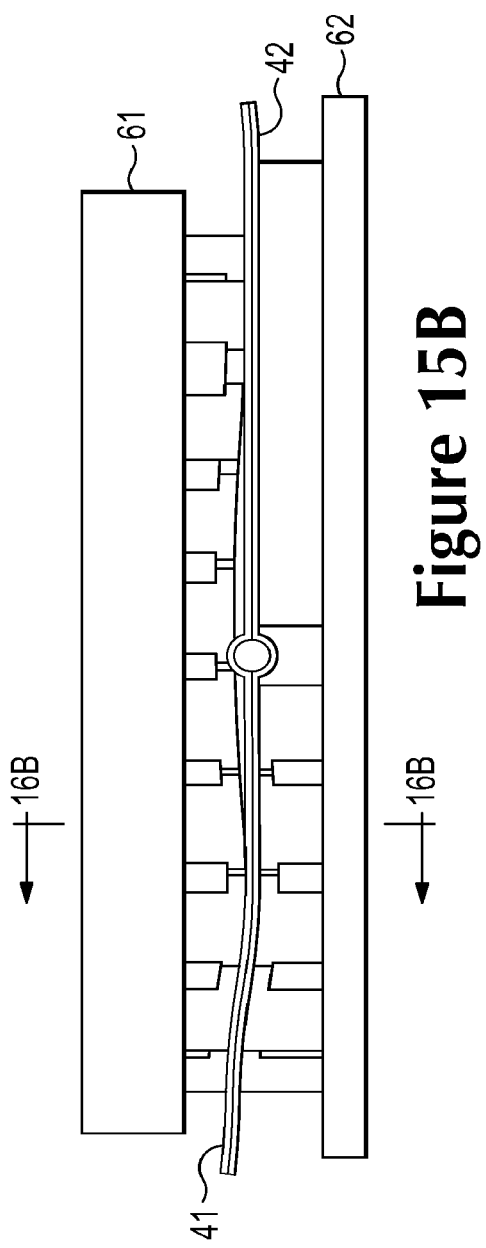
Figure 16A:
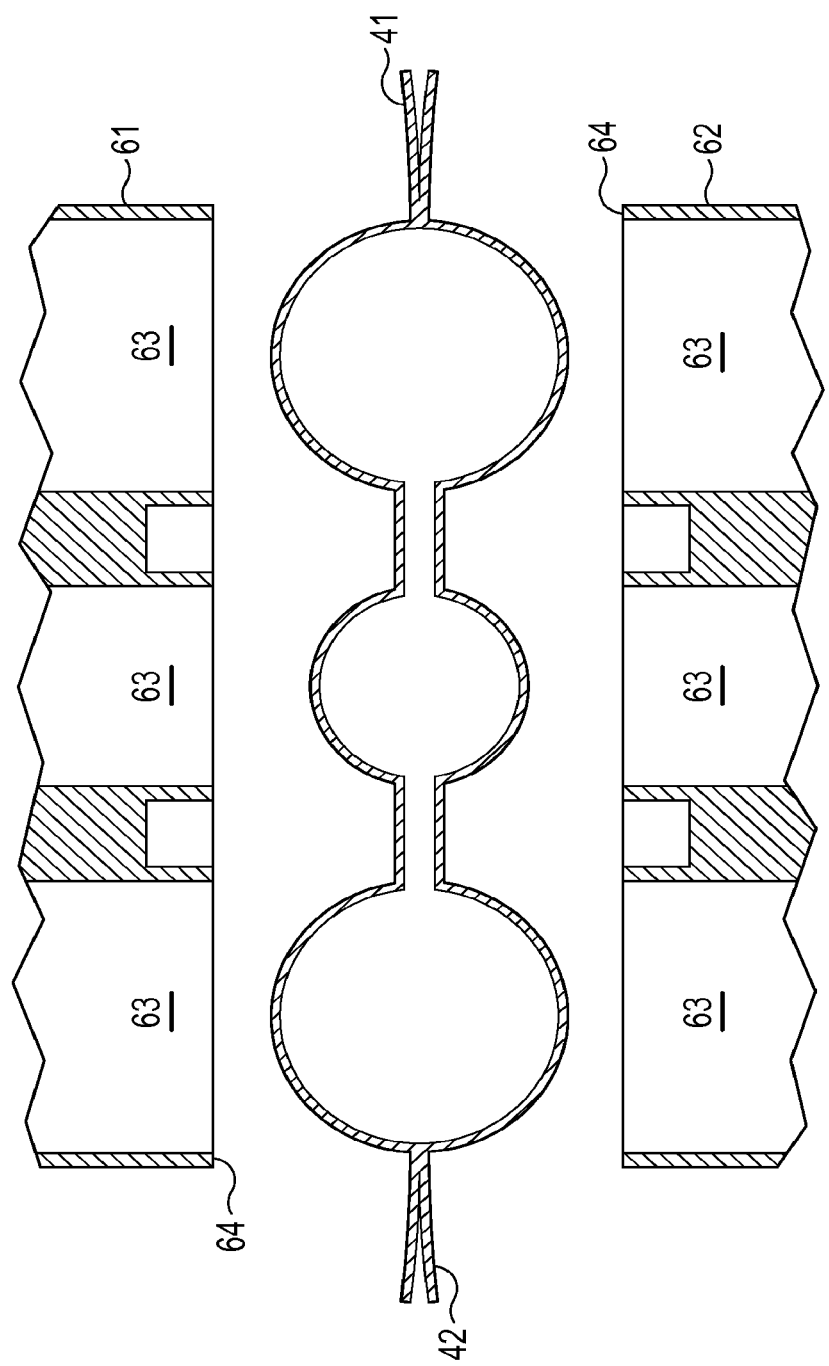
FIGS. 16A-16C are cross-sectional views of the bonding and inflation process, as respectively defined by section lines 16A-16C in FIGS. 15A-15C.
Figure 16B:
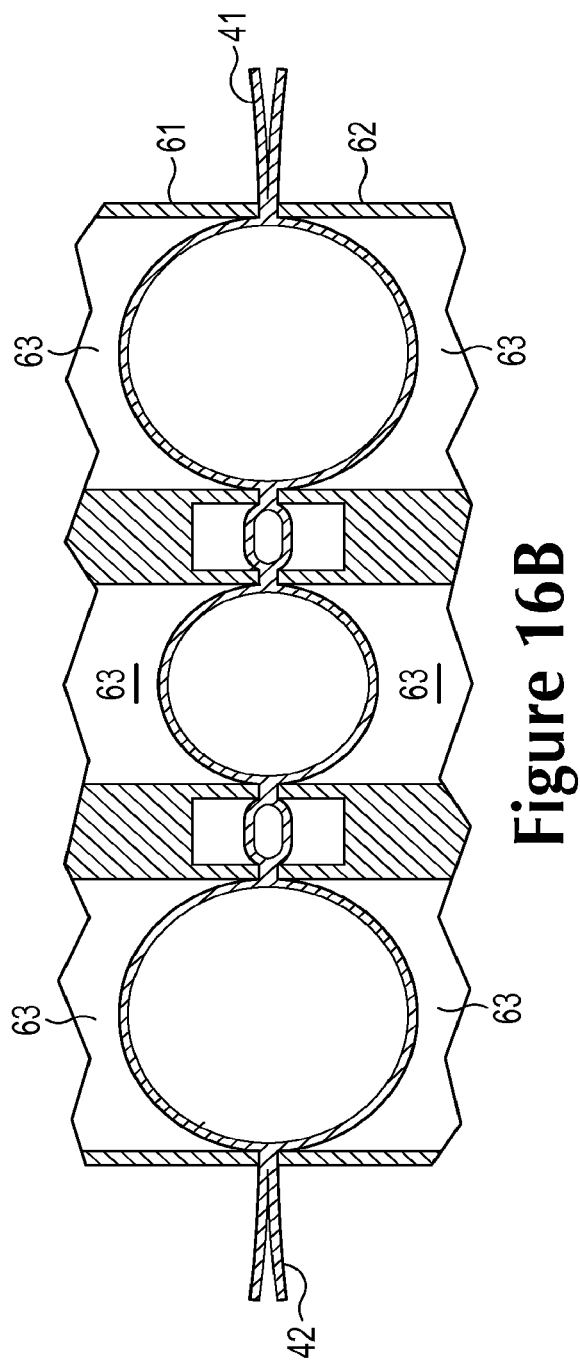

Once the molded layers 41 and 42 are positioned between portions 61 and 62, portions 61 and 62 translate toward each other such that layers 41 and 42 enter the internal cavity within inflate-bond tool 60, as depicted in FIGS. 15B and 16B. As inflate-bond tool 60 contacts and envelops the molded structure formed from layers 41 and 42, a fluid (e.g., a pressurized fluid or a fluid at ambient pressure) is injected through inflation connector 65 and into channel 47. The fluid then passes into the area between layers 41 and 42 that forms chamber 40. As the area between layers 41 and 42 is pressurized, radio frequency bonding may be utilized to form interior bonds 46. In other words, radio frequency energy that causes layers 41 and 42 to heat and bond may pass through inflate-bond tool 60, particularly at interior ridges 64. Given that layers 41 and 42 may be formed from a thermoplastic polymer material, the increased temperature causes the polymer material to melt or soften, thereby inducing bonding between layers 41 and 42. That is, the radio frequency energy passes through layers 41 and 42 at interior ridges 64 and causes layers 41 and 42 to bond with each other in areas corresponding with interior bonds 46.

As noted above, the inflation and bonding process involves inflating subchambers 43 and bonding layers 41 and 42 to form interior bonds 46. While positioned within inflate-bond tool 60, fluid is first injected into the area between layers 41 and 42 through inflation connector 65 and channel 47. Injecting the fluid effectively pressurizes the areas corresponding with subchambers 43. Once properly pressurized, the radio frequency energy forms interior bonds 46, thereby sealing the pressurized fluid within subchambers 43. Some of the pressurized fluid may also remain in web area 44, which causes layers 41 and 42 to bow outward slightly. In some configurations, however, the pressurized fluid may be allowed to exit web area 44. In other configurations of inflate-bond tool 60, conductive heating, adhesive joining, or other bonding techniques may be utilized to form interior bonds 46.

Figure 15C:
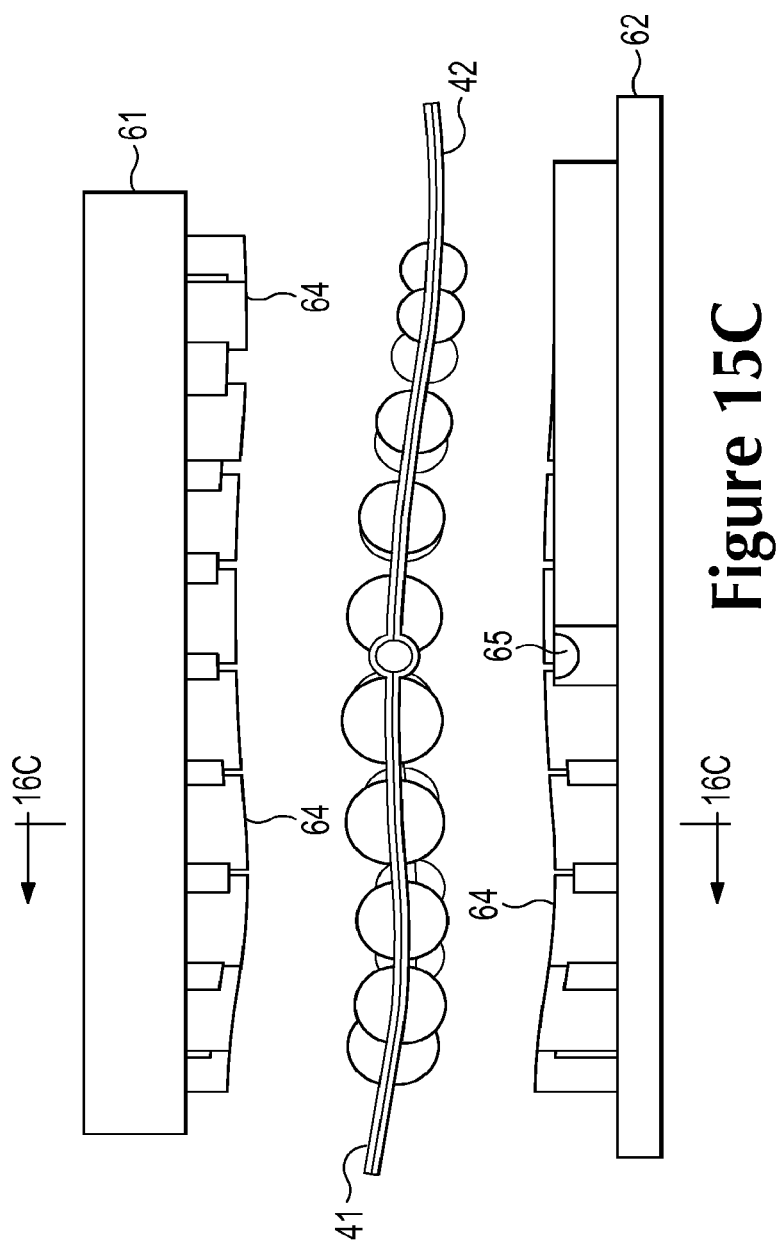
Figure 16C:
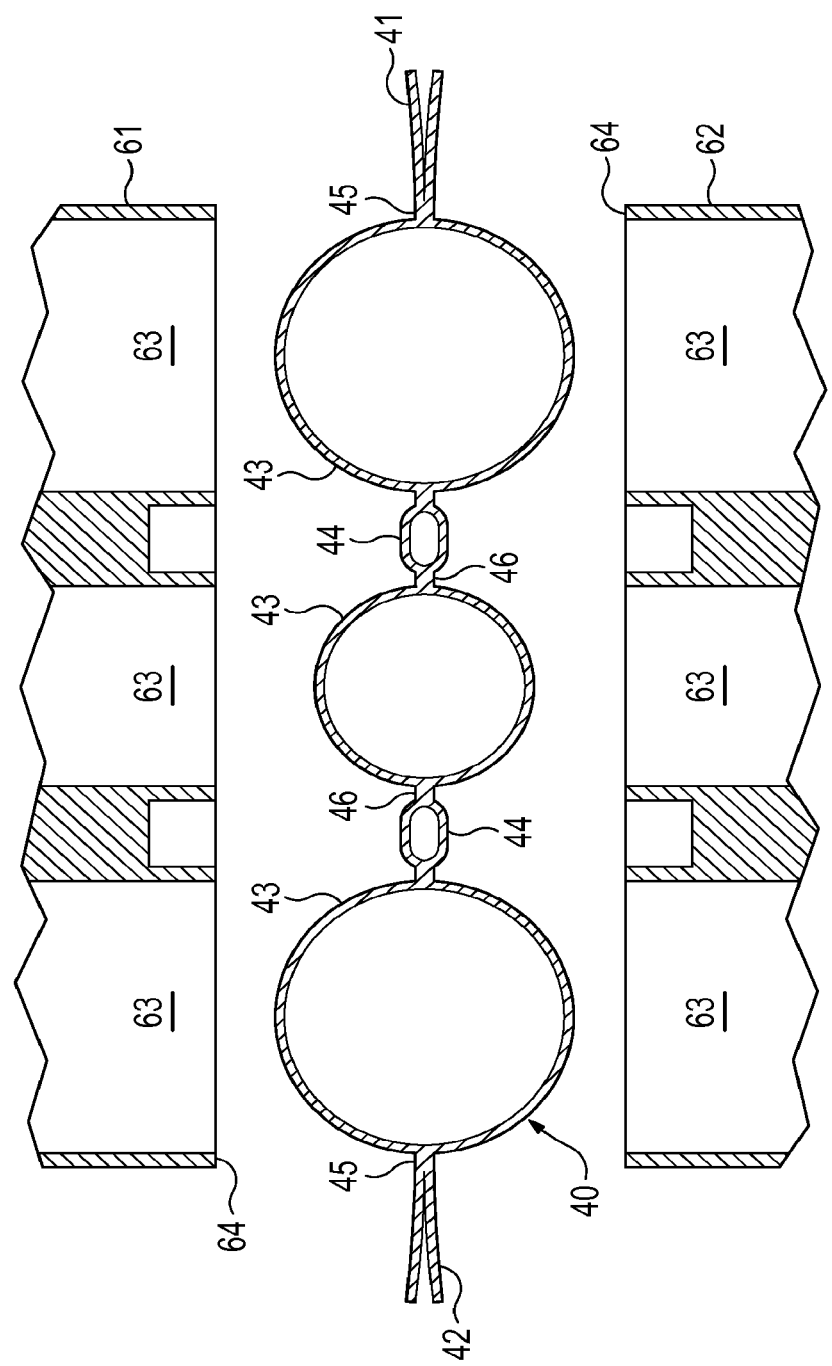

Once inflation and bonding are complete, portions 61 and 62 separate such that chamber 40 and other portions of layers 41 and 42 may be removed from inflate-bond tool 60, as depicted in FIGS. 15C and 16C. After proper cooling, the excess portions of layers 41 and 42 may be trimmed at peripheral bond 45 and recycled, thereby substantially completing the manufacture of chamber 40.

Figure 17:
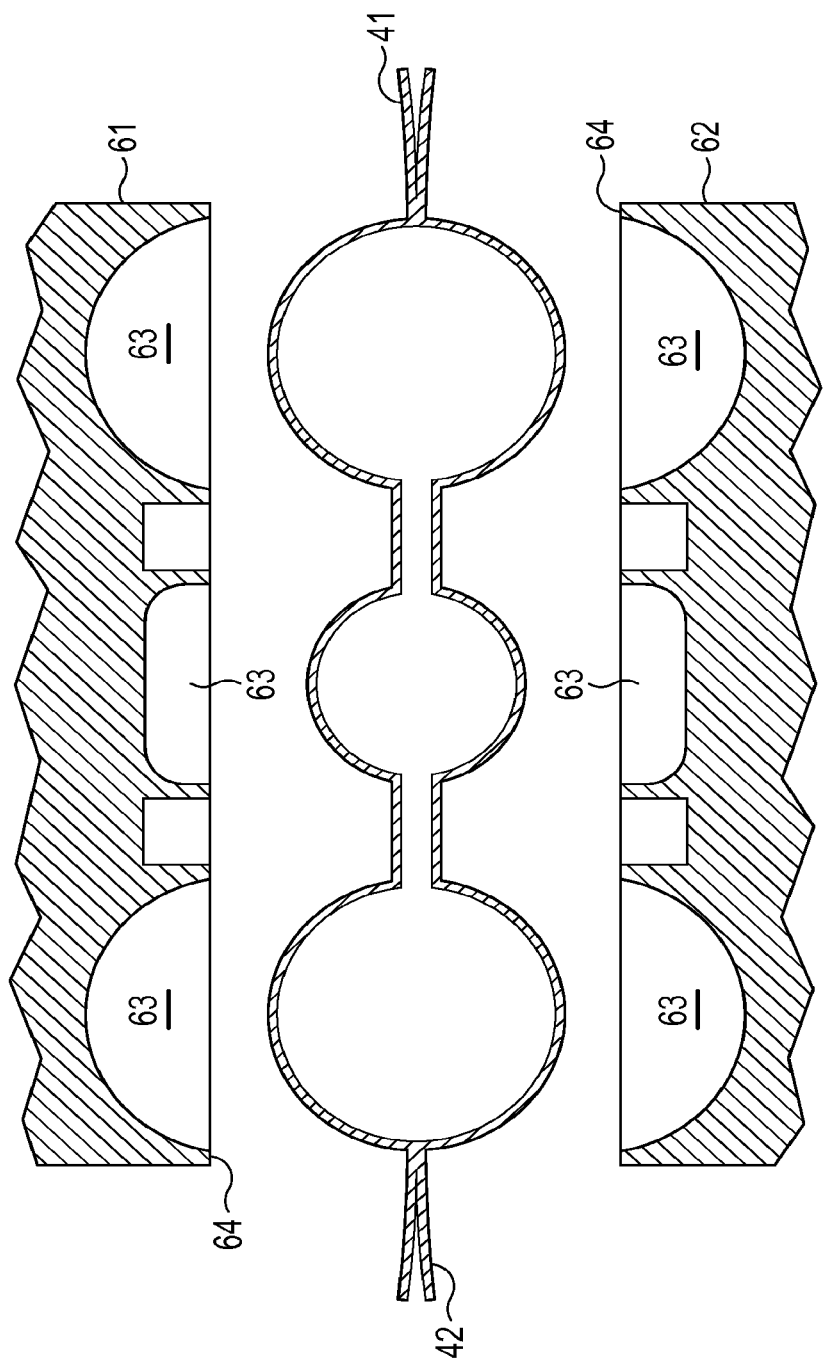
FIG. 17 is a cross-sectional views corresponding with FIG. 16A and depicting another configuration of the bonding and inflation process.

The procedures discussed above impart a configuration wherein each of subchambers 43 are pressurized to substantially the same pressure. Various techniques may be utilized, however, to pressurize subchambers 43 differently. Referring to FIG. 17, inflate-bond tool 60 has a configuration wherein the centrally-located indentations 63 are truncated or otherwise not large enough to accommodate the semi-circular protrusions in layers 41 and 42, whereas the peripherally-located indentations 63 have the same shape as the protrusions in layers 41 and 42. When layers 41 and 42 enter inflate-bond tool 60, the truncated indentations 63 compress the protrusions to reduce the volume in the centrally-located subchamber 43. Once pressurized and removed from inflate-bond tool 60, the pressure in the centrally-located subchamber 43 will be less than the pressure within other subchambers 43. Accordingly, the pressure of subchambers 43 may be controlled or otherwise modified by decreasing the volume of indentations 63 in inflate-bond tool 60.

Another method of varying the pressures within subchambers 63 is to utilize a two-stage bonding process. For example, the area between layers 41 and 42 may be pressurized to a first pressure and then some of interior bonds 46 are formed. The area between layers 41 and 42 may then be pressurized to a second pressure and the remainder of interior bonds 46 are formed. In this manner, some of subchambers 43 will be pressurized to the first pressure and some will be pressurized to the second pressure. Two inflate-bond tools 60 may be utilized in a two-stage bonding process to form the various interior bonds 46, but a single inflate-bond tool 60 that selectively forms interior bonds 46 may also be utilized.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

What is claimed is:
1. A fluid-filled chamber of a sole structure, the fluid-filled chamber comprising:
 a first polymer sheet;
 a second polymer sheet attached to the first polymer sheet and cooperating with the first polymer sheet to define molded regions respectively defining a plurality of protrusions, the plurality of protrusions including a first series of protrusions located along a periphery of a medial side of the chamber, a second series of protrusions located along a periphery of a lateral side of the chamber, a third series of protrusions extending along a periphery of the chamber between the first series of protrusions and the second series of protrusions, and a fourth series of protrusions (i) located between the first series of protrusions and the second series of protrusions, (ii) including protrusions that are smaller than the protrusions of the first series of protrusions, the protrusions of the second series of protrusions, and the protrusions of the third series of protrusions, and (iii) including at least one pair of protrusions that are aligned with one another along an axis that extends substantially perpendicular to a longitudinal axis of the sole structure, the first series of protrusions, the second series of protrusions, and the third series of protrusions bounding a heel region of the sole structure to define a depression in the heel region at the fourth series of protrusions;
 a first bond formed between the first polymer sheet and the second polymer sheet and extending around the periphery of the chamber; and a plurality of second bonds formed between the first polymer sheet and the second polymer sheet to form a web area located between the protrusions, the second bonds completely surrounding each of the protrusions to seal and pressurize a fluid within the protrusions.

2. The fluid-filled chamber of claim 1, wherein the first polymer sheet and the second polymer sheet remain spaced apart from each other in unbonded portions of the web area between the protrusions.

3. The fluid-filled chamber of claim 2, wherein the unbonded portions have a different shape than the plurality of protrusions.

4. The fluid-filled chamber of claim 2, wherein the unbonded portions are disposed between the first series of protrusions and the fourth series of protrusions and are disposed between the second series of protrusions and the fourth series of protrusions and include a substantially uniform size and shape at each location of the unbonded portions.

5. The fluid-filled chamber of claim 1, wherein a thickness of the chamber in the web area is less than a thickness of the chamber at the plurality of protrusions.

6. The fluid-filled chamber of claim 1, wherein the fluid is pressurized.

7. The fluid-filled chamber of claim 1, wherein the protrusions are operable to receive the fluid after formation of the first bond and before formation of the second bonds.

8. The fluid-filled chamber of claim 1, wherein the plurality of protrusions include a substantially spherical shape.

9. The fluid-filled chamber of claim 1, wherein the fluid within the protrusions defines a fixed volume.

10. An article of footwear incorporating the fluid-filled chamber of claim 1.

11. A fluid-filled chamber of a sole structure, the fluid-filled chamber comprising:
a first polymer sheet;
a second polymer sheet attached to the first polymer sheet and cooperating with the first polymer sheet to define molded regions respectively defining a plurality of protrusions, the plurality of protrusions including a first series of protrusions extending along a periphery of the chamber from a medial side of the chamber to a lateral side of the chamber and a second series of protrusions at least partially surrounded by the first series of protrusions, the protrusions of the second series of protrusions (i) being smaller than the protrusions of the first series of protrusions, (ii) including a pair of protrusions that are aligned with one another along an axis that extends substantially perpendicular to a longitudinal axis of the sole structure, and (iii) defining a depression in a heel region of the fluid-filled chamber;
a first bond formed between the first polymer sheet and the second polymer sheet and extending around the periphery of the chamber; and
a plurality of second bonds formed between the first polymer sheet and the second polymer sheet to form a web area located between the protrusions, the second bonds completely surrounding each of the protrusions to seal and pressurize a fluid within the protrusions.

12. The fluid-filled chamber of claim 11, wherein the first polymer sheet and the second polymer sheet remain spaced apart from each other in unbonded portions of the web area between the protrusions.

13. The fluid-filled chamber of claim 12, wherein the unbonded portions have a different shape than the plurality of protrusions.

14. The fluid-filled chamber of claim 12, wherein the unbonded portions are disposed between the first series of protrusions and the second series of protrusions and include a substantially uniform size and shape at each location of the unbonded portions.

15. The fluid-filled chamber of claim 11, wherein a thickness of the chamber in the web area is less than a thickness of the chamber at the plurality of protrusions.

16. The fluid-filled chamber of claim 11, wherein the fluid is pressurized.

17. The fluid-filled chamber of claim 11, wherein the protrusions are operable to receive the fluid after formation of the first bond and before formation of the second bonds.

18. The fluid-filled chamber of claim 11, wherein the plurality of protrusions include a substantially spherical shape.

19. The fluid-filled chamber of claim 11, wherein the fluid within the protrusions defines a fixed volume.

20. An article of footwear incorporating the fluid-filled chamber of claim 11.

* * * * *